(12) United States Patent  
Noble et al.

(10) Patent No.: US 7,427,200 B2  
(45) Date of Patent: Sep. 23, 2008

(54) COMPUTER-BASED TRAINING METHODS FOR SURGICAL PROCEDURES

(76) Inventors: Philip C. Noble, 3620 Albans Rd., Houston, TX (US) 77005; Michael Conditt, 1110 Anofover, Pearland, TX (US) 77504

( * ) Notice: Subject to any disclaimer, the term of this patent is extended or adjusted under 35 U.S.C. 154(b) by 908 days.

(21) Appl. No.: 10/417,403

(22) Filed: Apr. 16, 2003

(65) Prior Publication Data

US 2004/0030245 A1 Feb. 12, 2004

Related U.S. Application Data

(60) Provisional application No. 60/372,873, filed on Apr. 16, 2002.

(51) Int. Cl.
*G09B 23/28* (2006.01)
*A61B 5/00* (2006.01)

(52) U.S. Cl. .................. 434/274; 600/416; 703/11; 378/20; 345/581; 345/619

(58) Field of Classification Search .................. 434/274; 703/11; 600/416; 378/20
See application file for complete search history.

(56) References Cited

U.S. PATENT DOCUMENTS

| | | | |
|---|---|---|---|
| 5,769,092 A | 6/1998 | Williamson et al. | |
| 5,806,518 A | 9/1998 | Mittelstadt | |
| 5,880,976 A | 3/1999 | DiGioia, III et al. | |
| 5,995,738 A | 11/1999 | DiGioia, III et al. | |
| 6,002,859 A | 12/1999 | DiGioia, III et al. | |
| 6,033,415 A | 3/2000 | Mittelstadt et al. | |
| 6,205,411 B1 * | 3/2001 | DiGioia et al. | 703/11 |
| 6,226,548 B1 | 5/2001 | Foley et al. | |
| 6,285,902 B1 | 9/2001 | Kienzle, III et al. | |
| 6,711,432 B1 | 3/2004 | Krause et al. | |
| 2004/0039259 A1 | 2/2004 | Krause et al. | |

FOREIGN PATENT DOCUMENTS

WO    WO 02/094080    11/2002

OTHER PUBLICATIONS

Navitrack™ 3-D Surgical Guidance System website (www.orthosoft.ca) (2001).
BrainLAB AG website (www.brainlab.com) (2001).
Notification of Transmittal of International Preliminary Examination Report (Form PCT/IPEA/416), dated Jun. 18, 2004 (4 pages).

(Continued)

*Primary Examiner*—Brian L. Casler
*Assistant Examiner*—Parikha S Mehta
(74) *Attorney, Agent, or Firm*—Conley Rose, P.C.

(57) ABSTRACT

A method is disclosed for analyzing surgical techniques using a computer system for gathering and analyzing surgical data acquired during a surgical procedure on a body portion and comparing that data to pre-selected target values for the particular surgical procedure. The inventive method allows the surgeon, for example, to measure the technical success of a surgical procedure in terms of quantifiable geometric, spatial, kinematic or kinetic parameters. The method comprises calculation of these parameters from data collected during a surgical procedure and then comparing these results with values of the same parameters derived from target values defined by the surgeon, surgical convention, or computer simulation of the same procedure prior to the operation itself.

36 Claims, 21 Drawing Sheets

OTHER PUBLICATIONS

Notification of Transmittal of the International Search Report or the Declaration (Form PCT/ISA/220), dated May 10, 2004 (5 pages).
Supplementary EPO search report (Aug. 2, 2006).

Sagesser, H.R., "Virtual Reality in the Operating Room," Sulzer Medica J. 2:7-9 (2000).

* cited by examiner

Femoral Axes

F/E Axis – centers of spheres fit to the condylar surfaces of the intact femur

Longitudinal Axis – line of best fit through the centroids of femoral cross sections

Mechanical Axis – in the plane of the longitudinal axis and perpendicular to the F/E axis

AP Axis – mutually orthogonal to the longitudinal and F/E axes

Tibial Axes

Longitudinal Axis – best line fit through the centroids of tibial cross sections

M/L Axis – average of centers of circles fit to the cortical edges of surfaces of the intact tibia at slices 2, 4, and 7 mm distal to the tibial plateau

AP Axis – mutually orthogonal to the above axes

Distal Cut:
7.7mm lat   10.1mm med
Posterior Cut:
10.2mm lat   13.3mm med

*Alignment*
5.9° posterior slope
(Target: 9 deg)

*Actual Cut*
5.9° posterior slope
0.7° varus

COMPUTER-BASED TRAINING METHODS FOR SURGICAL PROCEDURES

This application claims the benefit of the filing of co-pending U.S. Provisional application No. 60/372,873, filed Apr. 16, 2002, and which is incorporated by reference herein in its entirety.

BACKGROUND OF THE INVENTION

Many different surgical procedures are performed to restore normal function of the musculoskeletal system after acute injury (eg fracture of a bone), or to treat long standing deformities or chronic diseases (eg. arthroplasty to replace arthritic joints). Certain mechanical and spatial parameters define the technical success of these procedures. These parameters typically describe quantities such as:
1. The alignment of bones on each side of a joint or bony fragments fixed in position after a fracture;
2. The shift in the original position of musculoskeletal tissues (e.g. bones or bony fragments, tendons, muscles, and ligaments) with respect to their relative position in the healthy skeleton;
3. The laxity of joints under external distracting or shearing loads; and
4. The relative position of bones during joint motion, including the limits of motion imposed by the joints or body tissues.

Based on extensive experience in reviewing the results of each operative procedure, and the function of the musculoskeletal system in health and disease, orthopedic surgeons have developed quantitative guidelines for target values of each of these parameters. Through reference to these target values, surgeons are able to gauge their success in achieving the "technical goals" of each procedure. Although many surgeons agree on the values of each of the parameters defining the technical success of each operative procedure, few tools are available, during the surgical procedure, to tell the surgeon the extent to which the technical goals of the procedure have been achieved. Numerous disclosures within the patent literature teach methods for guiding surgeons during surgery using computer-based systems within the operating room. These systems have been introduced into many operating rooms in Europe and are generally termed "Surgical Navigation Systems." These systems generally consist of a computer connected to opto-electrical devices that are utilized to measure the relative position of musculoskeletal structures, typically bones, during the operation. Typically, optical devices are rigidly connected to bony structures and to instruments that are aligned with bony surfaces cut or machined by the surgeon. The system collects information from the measurement devices and is able to calculate the alignment and relative spatial position of each bone and any other feature of interest through reference to the known geometry of each instrument, bone and machined bony surface. Typically, information is displayed in graphical form on a computer monitor to provide information that is useful as a guide to the surgeon. In many systems, the surgeon sees a three-dimensional rendering of the bones of relevance to the procedure and the relative position and alignment of his instruments and reference axes.

Although Surgical Navigation Systems can be useful to the surgeon in providing immediate spatial information during surgery, this approach has several practical shortcomings:
1. To generate accurate, patient-specific models of bony anatomy, computer tomographic (CT) scans are required of each patient. In many parts of the world, this adds significant expense to the use of the System, because of the cost of the CT scan and the time required to prepare a three-dimensional computer model from the CT data. Although this issue may be addressed through use of generic computer models, or through collection of data intraoperatively, both of these solutions involve either a reduction of accuracy or additional expense through time and equipment.
2. Surgical Navigation Systems require additional time and personnel in the operating room to set-up and operate the equipment, to attach optical markers to the skeleton, to register computer models to the optical markers, and to collect and interpret data. This leads to longer operations and a significant reduction in productivity for the operating room. As operating room time is extremely expensive and reimbursement for operative procedures is often fixed, independent of the equipment utilized to perform the procedure, utilization of Surgical Navigation Systems is often commercially unattractive.
3. The computer routines developed for use with these systems are specific to each surgical procedure performed by orthopedic surgeons. This means that surgeons who are not specialized, in that they perform procedures involving different parts of the body (eg. knee replacement, ligamentous reconstruction, and fracture reduction), can only gain access to this technology if they operate at large medical centers with the resources to afford the cost of the Surgical Navigation System and each of the specialized computer programs. As most surgery in the United States, as well as many other countries, is performed at many small facilities, most patients will not be able to receive the benefit of the existing Surgical Navigation Technology.
4. Some of the present Surgical Navigation Systems are cumbersome to use and necessitate increased surgical exposure. This is only possible through larger surgical incisions which increases the length of the patient's recovery and the risk of an intraoperative infection. Some systems also utilize optical marker arrays which are connected to the computer with wires which can complicate the surgical procedure.

SUMMARY OF THE INVENTION

To overcome these obstacles, the present invention takes a different approach to Surgical Navigation utilizing similar technology. Specifically, the present invention comprises, in certain aspects, a computer-based system that allows the surgeon to train outside the operating room to develop and refine skills specific to a particular surgical procedure. Once these skills have been developed using the inventive training method, the surgeon is able to operate freely in the operating room without the expense or the impediments associated with conventional Surgical Navigation Systems.

Specifically, the present invention, in certain aspects, is a method that comprises (a) generating three-dimensional (3D) computer models of orthopedic devices (i.e. orthopedic instruments and implants), wherein the data corresponding to the 3D models is stored in a memory system of a computer, the computer being operatively interfaced with a visual display monitor; (b) generating 3D models of a targeted surgical site on a body portion based upon tomographic data stored in the memory system for the surgical site; and (c) inputting into the memory system select target values corresponding to one or more measurable technical parameters associated with the surgical procedure. These technical parameters include three-dimensional positioning and dimensions of bones, three-dimensional positioning and dimensions of soft tissue structures, three-dimensional positioning and dimensions of orthopedic devices for surgery, and values corresponding to range and loading forces associated with physiologic joint motion, and joint laxity. One or more tracking devices, such as optical tracking devices, for example, which are operatively in communication with the computer system, are attached to the body portion. The surgical procedure is then performed on the surgical site, during which time data generated during the surgical procedure is recorded by the tracking devices and stored in the computer memory system. This tracking data corresponds to positioning of the orthopedic devices, bones, and soft tissue structures. Next, actual values based upon the tracking data are calculated, the actual values corresponding to the technical parameters set for the surgical procedure.

Once the actual values are calculated, the actual values are compared to the target values set for the technical parameters selected. In certain aspects of the present invention, this is achieved by generating (on a computer monitor or via a computer paper print-out, for example) a final three-dimensional model corresponding to the 3D models of the orthopedic devices and body portion post-surgery. The final 3D model shows actual positions compared to targeted positions of the orthopedic devices with respect to selected anatomical features (i.e. bones and soft tissue structures) within the targeted surgical site of the body portion. The actual positions correspond to the actual values calculated while the targeted positions correspond to the target values inputted previously. In certain embodiments, the final 3D model shows differences between (a) actual positions of the orthopedic devices with respect to the anatomical features and (b) target positions of the orthopedic device with respect to the anatomical features. Here, the target positions may be defined by one or more of the following: i) fixed anatomic landmarks, ii) derived mechanical axes, iii) derived anatomic axes, iv) positions selected by a surgeon, and v) positions pre-determined by consensus or convention within a surgical community.

The comparison between actual and target values set for the technical parameters selected may also be achieved, in certain aspects of the present invention, by generating and displaying on the monitor a final 3D model corresponding to the 3D models of the orthopedic devices and body portion post-surgery. Here the final model may show actual responses of anatomical features to loading forces based upon the actual values calculated as compared to predicted responses of the anatomical features (i.e. bones and soft tissue structures) to loading forces based upon the target values inputted. In certain aspects, the actual and predicted responses to the loading forces displayed on said final three-dimensional model include displaying (a) geometry of space between resected bony surfaces, (b) overall position of a bone or extremity, (c) changes in length of a bone or extremity, (d) magnitude or distribution of mechanical axes, (e) magnitude or distribution of anatomic axes, (f) positions selected by a surgeon, and (e) positions pre-determined by consensus or convention within a surgical community.

In certain aspects of the present invention, once the actual values are calculated based upon the tracking data recorded, one or more actual values may be compared to the target values via a graph displayed on the monitor and/or printed out directly on paper via a computer printer. The graph may, in certain embodiments, comprise X- and Y-axes, each of which corresponding to a range of technical parameters. The graph may further include one or more visual target zones corresponding to an acceptable range of target values, wherein the actual values are plotted on the graph, either outside or within one or more of the target zones.

The method, in certain aspects, may include performing a surgical procedure having two or more procedural steps and then evaluating one or more of the steps per the inventive method. Here, the comparison of actual and target values may be achieved by generating and displaying on the monitor a final 3D model corresponding to the 3D models of the orthopedic devices and body post-surgery for at least one of the procedural steps, the final model showing actual positions of the orthopedic devices with respect to the body portion compared to targeted positions of the devices with respect to the body portion for at least one of the procedural steps. The actual positions correspond to the actual values calculated, and the targeted positions correspond to the target values inputted. Thus, comparisons can be made for each step of the surgical procedure.

In all of the foregoing aspects of the inventive method, the final three-dimensional model may be used as a surgical training tool for understanding the errors and reasons for those errors that occurred during the surgical procedure, for evaluating different surgical techniques, for evaluating the abilities of different surgeons, and for evaluating the performance characteristics of one or more orthopedic devices used during the surgical procedure.

The inventive method, in certain aspects, also includes (a) generating three-dimensional (3D) computer models of orthopedic devices (i.e. orthopedic instruments and implants), wherein the data corresponding to the 3D models is stored in a memory system of a computer, the computer being operatively interfaced with a visual display monitor; (b) generating 3D models of a targeted surgical site on a body portion based upon tomographic data stored in the memory system for the surgical site; and (c) inputting into the memory system select target values corresponding to one or more measurable technical parameters associated with the surgical procedure. These technical parameters include three-dimensional positioning and dimensions of bones, three-dimensional positioning and dimensions of soft tissue structures, three-dimensional positioning and dimensions of orthopedic devices for surgery, and values corresponding to range and loading forces associated with physiologic joint motion and joint laxity. Once the 3D models are generated, data generated from two or more surgical procedures is inputted into the memory system. This data, which was recorded previously via tracking devices used in those surgical procedures, corresponds to the positioning of the orthopedic devices, bones, and soft tissue structures. Actual values based upon the tracking data for all of the surgical procedures is then calculated. These actual values are then compared to the target values via the display of one or more graphs on the computer monitor. In certain aspects of the invention, two or more of the surgical procedures are performed by different surgeons, such that a graph may be generated comparing the surgical results of the different surgeons. As for the other aspects of the present invention, this embodiment of the invention (i.e. comparing results of different surgeons) may also be used as a surgical training tool for understanding the errors and reasons for those errors that occurred during the surgical procedure, for evaluating different surgical techniques, and for evaluating the performance characteristics of one or more orthopedic devices used during the surgical procedure, the performance or efficacy of different surgical techniques used for certain surgical procedures, in addition to evaluating the skills of the different surgeons. In other aspects of the present invention, the method may be used as an aid in developing preoperative plans for future surgical procedures, wherein, for example, actual data collected over time via multiple operations of the inventive method may be compared and analyzed to determine optimal positioning of surgical instruments and/or implants for a particular procedure. Similarly, actual data collected via multiple operations of the inventive method may be compared and analyzed to predict "variability envelopes" and final alignment of implants for use in the development of future preoperative plans.

DESCRIPTION OF THE PREFERRED EMBODIMENTS

The present invention is directed to a method suitable for analyzing surgical techniques using a computer system for gathering and analyzing surgical data acquired during a surgical procedure on a body portion and comparing that data to pre-selected target values for the particular surgical procedure. The present invention allows the surgeon, for example, to measure the technical success of a surgical procedure in terms of quantifiable geometric, spatial, kinematic or kinetic parameters. This process entails calculation of these parameters from data collected during a surgical procedure and then comparing these results with values of the same parameters derived from target values defined by the surgeon, surgical convention, or computer simulation of the same procedure prior to the operation itself.

For purposes of illustration only, much of the following description of the present invention is made with specific reference to its utilization in total knee and total hip arthroplasty. It will be readily recognized by those of ordinary skill in the art, however, that the present invention may be utilized in almost all orthopedic surgical procedures, including, but not limited to, joint reconstruction, fracture reduction, surgical excision and ablation of tumors, and the like.

Figure 1:
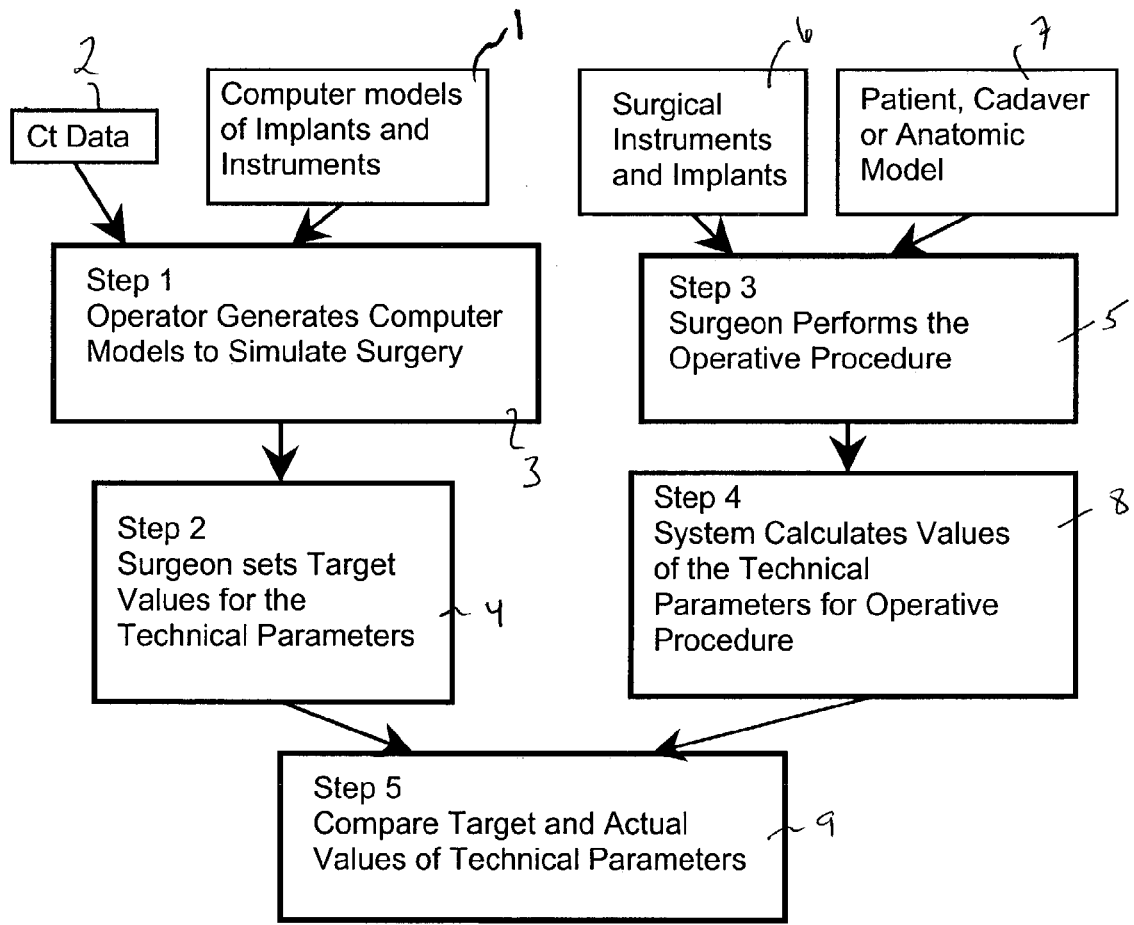
FIG. 1 is a flow chart of describing broadly the inventive method.

A. Generation of Computer Models:

FIG. 1 is a flow chart illustrating broadly the inventive method. As shown therein, the method first comprises, in certain aspects, the generation of three-dimensional computer models of the surgical devices 1 to be used during a surgical procedure using available software programs commonly known and used by those of ordinary skill in the art. Exemplary software programs include computer-aided design (CAD) software such as UNIGRAPHICS (vended by EDS in Plano, Tex.), PROENGINEER (vended by PTC, in Needham, Mass.), and AUTOCAD (vended by Autodesk, in San Rafael, Calif.). Data associated with the generation of these three-dimensional models is stored in a memory system of a computer system, the computer system being operatively interfaced with a visual display monitor. A preferred computer system includes a Windows-based x86 class machine. As used herein, "surgical devices" include, but are not limited to, orthopedic surgical instruments, such as cutting guides, spreaders, various cutting and drilling tools, intramedullary rods, stabilizing pins, reamers, awls, extramedullary alignment guides, distal femoral components, custom devices to measure the planarity of cut surfaces, and the like. "Surgical devices" also include, but are not limited to orthopedic implants, such as femoral stems, acetabular cups, distal femoral components, tibial trays, stem extensions, tibial inserts, patellar components, and the like.

The inventive method further comprises gathering tomographic data for a target surgical site on a body portion of a human or animal 2. In orthopedic applications, the body portion will generally be any of the major joints, such as the hip, knee, shoulder, wrist, elbow, ankle, and joints associated with the fingers and toes, as well as the soft tissue structures (i.e. ligaments, tendons, cartilage, muscle) associated with these bony areas. The body portion may also include the spine and skull. It will be recognized by those of ordinary skill in the art that the present inventive method may be suitable for non-orthopedic procedures, and thus, the body portion associated with the targeted surgical site may be elsewhere. Moreover, "body portion," as used herein, may be of a live patient (human or animal), a whole cadaver, partial cadaver, or an inanimate anatomical models. While computed tomography (CT) is preferred, other suitable tomographic techniques may be employed, including, but not limited to, magnetic resonance imaging (MRI), positron emission tomography (PET), or ultrasound scanning, as discussed in U.S. Pat. No. 6,205, 411 to DiGioia, III et al. (hereinafter "DiGioia III, et al"), and incorporated by reference herein in its entirety.

The tomographic data of the body portion is transmitted to a computer memory system. Based upon this tomographic data, the computer system uses software loaded therein and programmed to create three-dimensional models of the body portion, namely the bony and soft-tissue structures affected during the surgical procedures 3. Exemplary software programs include, but are not limited to, MATERIALIZE and ANALYZE 3D.

Figure 2:
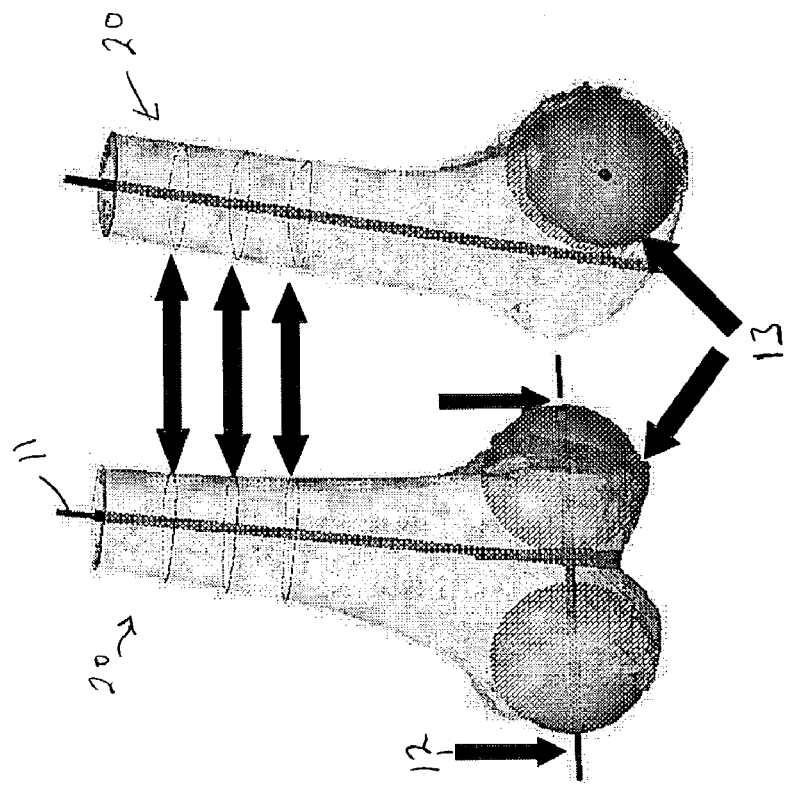
FIGS. 2 and 3 illustrate femoral and tibial axes defining the absolute coordinate system used in generating 3D models of these anatomical features in knee arthroscopy.
Figure 3:
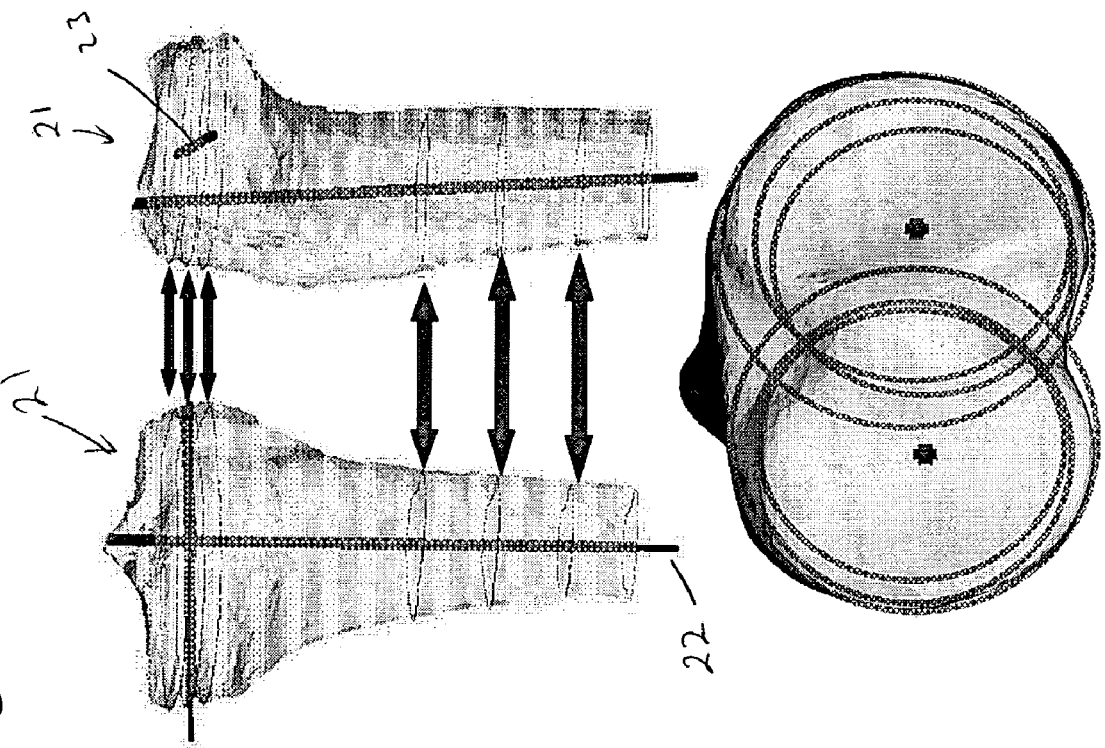

B. Setting of Target Values for Technical Parameters:

Once the computer models are generated, select target values corresponding to one or more measurable technical parameters associated with the surgical procedure are inputted into the memory system 4. These parameters form the basis for evaluating the surgeon's technical performance in performing the surgical procedure. Typically, these parameters will define the three-dimensional position and dimensions of bones, bony fragments, and soft tissue structures during the surgical procedure. [Note: as used herein, the term "bones" includes whole bones, bone portions, or bony fragments. Moreover, the terms "position" and "positioning" are intended to include the ordinary meaning of the terms "alignment" and "orientation," as well.]. Technical parameters may also define the three-dimensional positioning and dimensions of devices used (or implanted) during the surgical procedure. In knee arthroplasty, for example, technical parameters are defined with respect to the femoral axes (i.e. flexion/extension; longitudinal, mechanical, and anterior/posterior) and tibial axes (i.e. longitudinal, medial/lateral, and anterior/posterior) (FIGS. 2-3). The technical parameters selected may also describe the range and loading forces associated with physiologic joint motion, including, but not limited to, joint laxity, soft-tissue balance, range-of motion. In some instances, the surgeon may simply elect to accept default values for each parameter that have been adopted from published guidelines. In other cases, the surgeon may choose to simulate the surgical procedure within the computer using computer-generated models of bony and soft-tissue structures and the surgical instruments and implants. On the basis of this simulation and, quite possibly, computer routines that predict some parameters describing expected joint function, the surgeon may elect to modify the default parameters or may accept their applicability.

Figure 4:
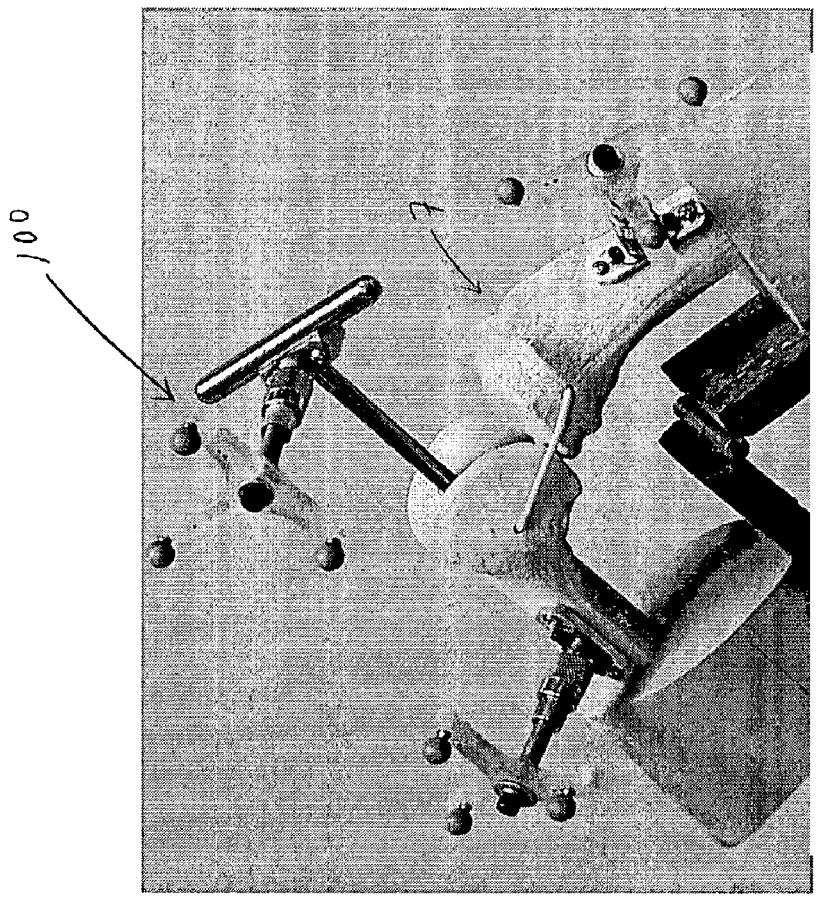
FIG. 4 illustrates an exemplary tracking system attached to the femur and tibia of a knee model.
Figure 4:
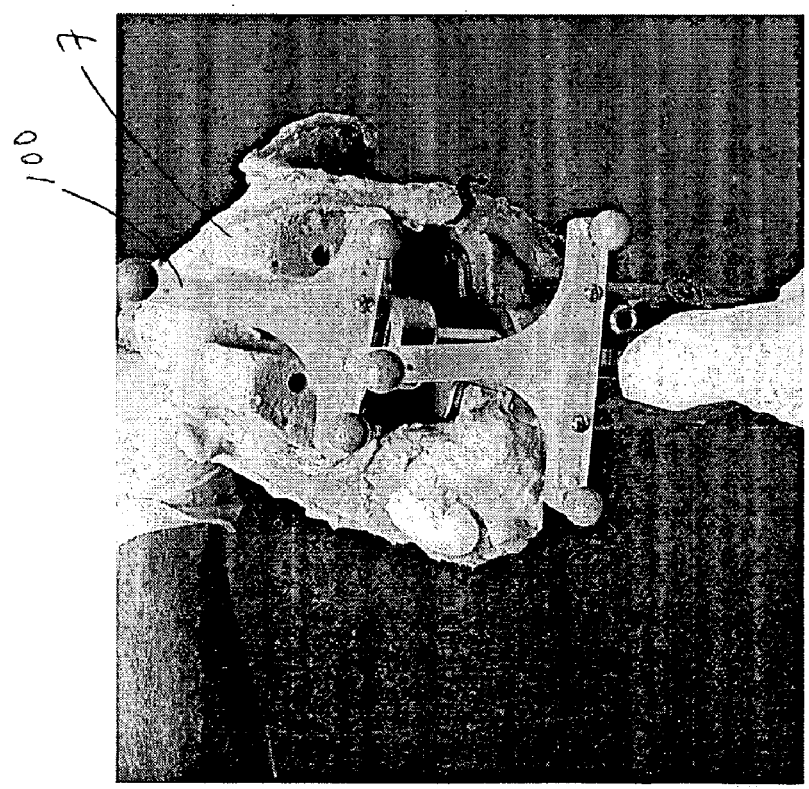

C. The Surgical Procedure:

Once the surgeon has set the target values for each technical parameter, he or she performs the same surgical procedure 5 on the body portion (i.e. an inanimate model, cadaver or cadaveric portion, or live patient) 7. During this procedure, the three-dimensional position and orientation of the surgeon's instruments 6 and/or surgical implants and the bones and/or soft tissues 7 are recorded using an tracking system 100, such as an optical tracking system, vending by Northern Digital, Inc. (Waterloo, Canada), or similar devices, including but not limited to infrared optical, DC magnetic, AC magnetic, laser optical and inertial tracking technologies, as also described in DiGioia, III et al. (see FIG. 4, for example). This tracking data, in orthopedic applications, corresponds to one or more of the technical parameters discussed above (e.g. positioning of the surgical devices, bones, and soft tissue structures as well as the range and forces of physiologic joint motion. The tracking device is operatively connected to the computer, and thus the tracking data recorded is stored within the computer memory system, It should be noted that during the data collection process the surgeon receives no information regarding his technical performance or any differences between the intended position or orientation of each instrument or implant, and the actual position or orientation achieved during the surgical procedure.

D. Calculation of Technical Parameters (i.e. Actual Values:

The actual data collected during the surgical procedure is processed to obtain calculated actual values that may be depicted visually on the computer monitor, for example (and/or printed out on paper via a computer printer), either via generation of a graph or three-dimensional models 8. These actual values correspond to the technical parameters set for the surgical procedure, as discussed in more detail below.

E. Evaluation of Technical Performance:

The actual values derived from the surgical procedure are compared with the original target values 9. In the case of many operations, this entails comparing the three-dimensional position of implanted components after surgery with the intended or target values. Specifically, in this regard, the inventive method comprises generating and displaying on the computer monitor a final three-dimensional model corresponding to the three-dimensional models of the surgical devices and body portion post-surgery. This final three-dimensional model shows the actual positions and target positions of the surgical devices with respect to selected anatomic features (i.e. bone and soft tissue structures). These actual positions correspond to the actual values calculated, and the targeted positions correspond to the target values selected and inputted into the computer memory system.

F. Data Representation:

Several different report formats are available to display the results of the inventive method in a way that is most meaningful for the surgeon. One form is a graph in which at least two variables are displayed (e.g. measures of bony alignment and joint laxity). As used herein, "graph" includes, but is not limited to, two-axis graphs (i.e. X-axis vs. Y-axis), pie charts, bar charts, three-axis graphs (i.e. X-, Y-, and Z-axes), and other types of diagram suitable for depicting the desired results (see FIGS. 5-10 and 13, for example). For example, the graph may have an X-axis and a Y-axis corresponding to a range of two separate technical parameters, as shown in FIG. 7, for example. The graph may further comprise one or more visual target zones corresponding to an acceptable range of target values. The actual values calculated for the technical parameters are labeled on the axes and may be visually plotted on the graph, either within or outside one or more target zones.

Figure 5:
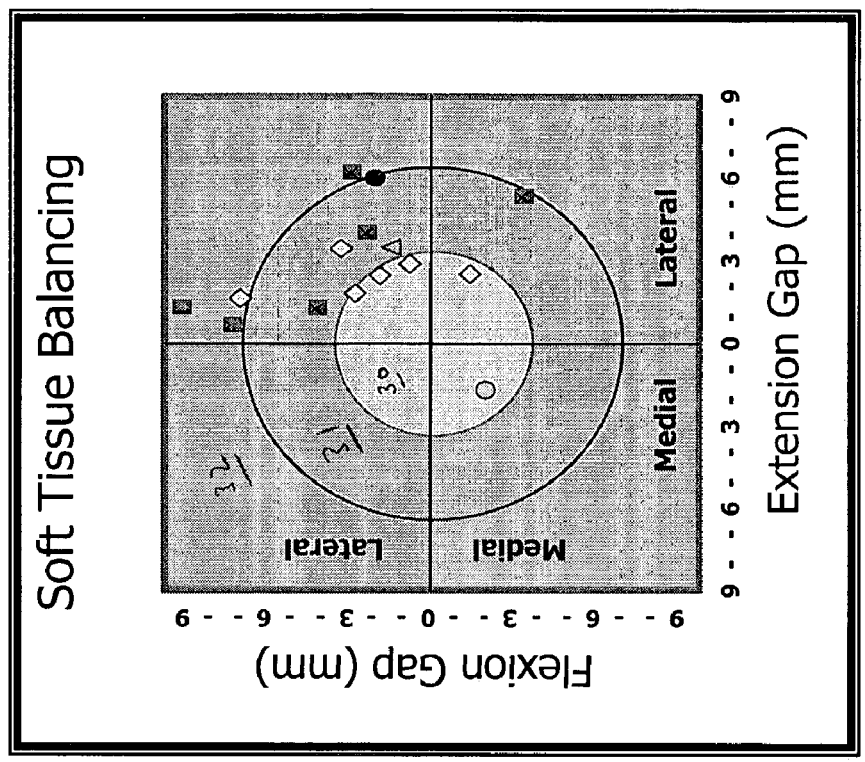
FIGS. 5-9 are various graphs and drawings used to illustrate the use of the inventive method in a knee arthroscopy experiment described in Example 1.
Figure 5:
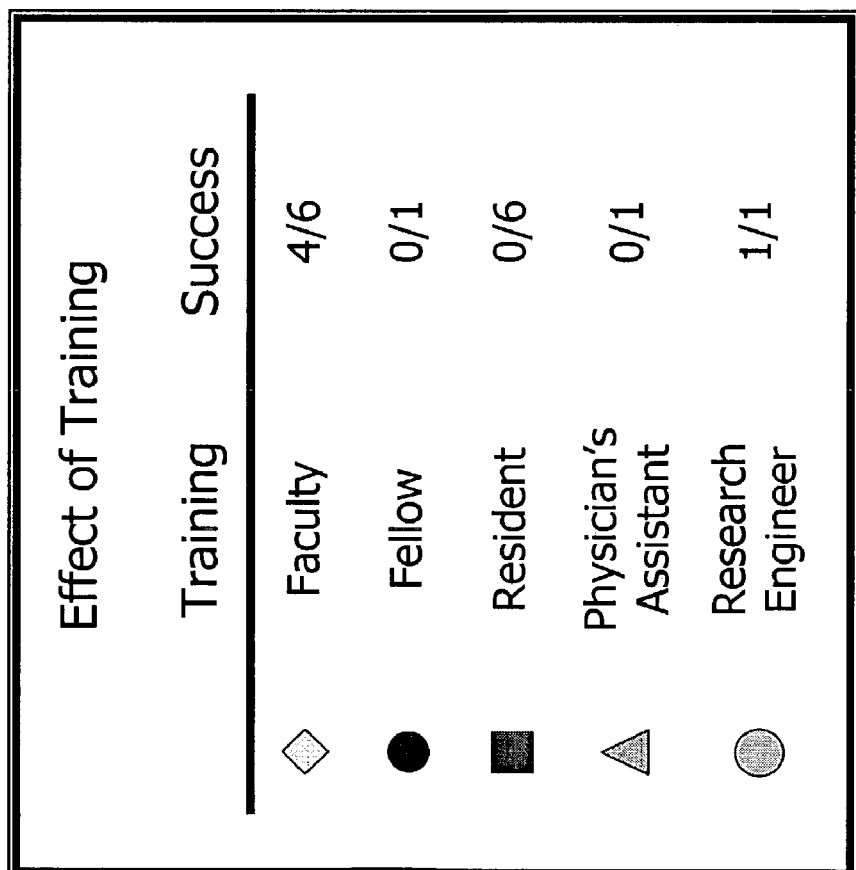
Figure 6:
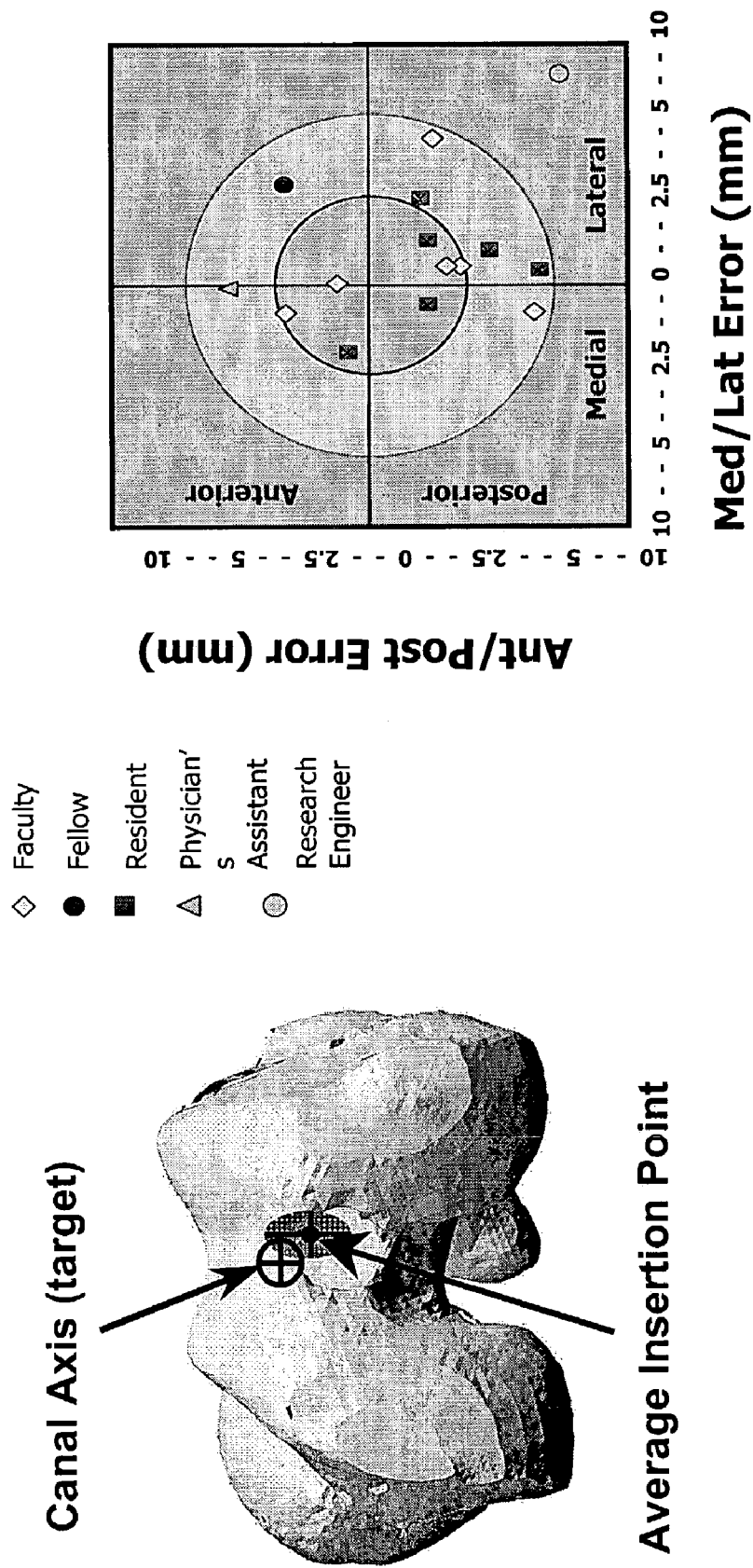
Figure 7:
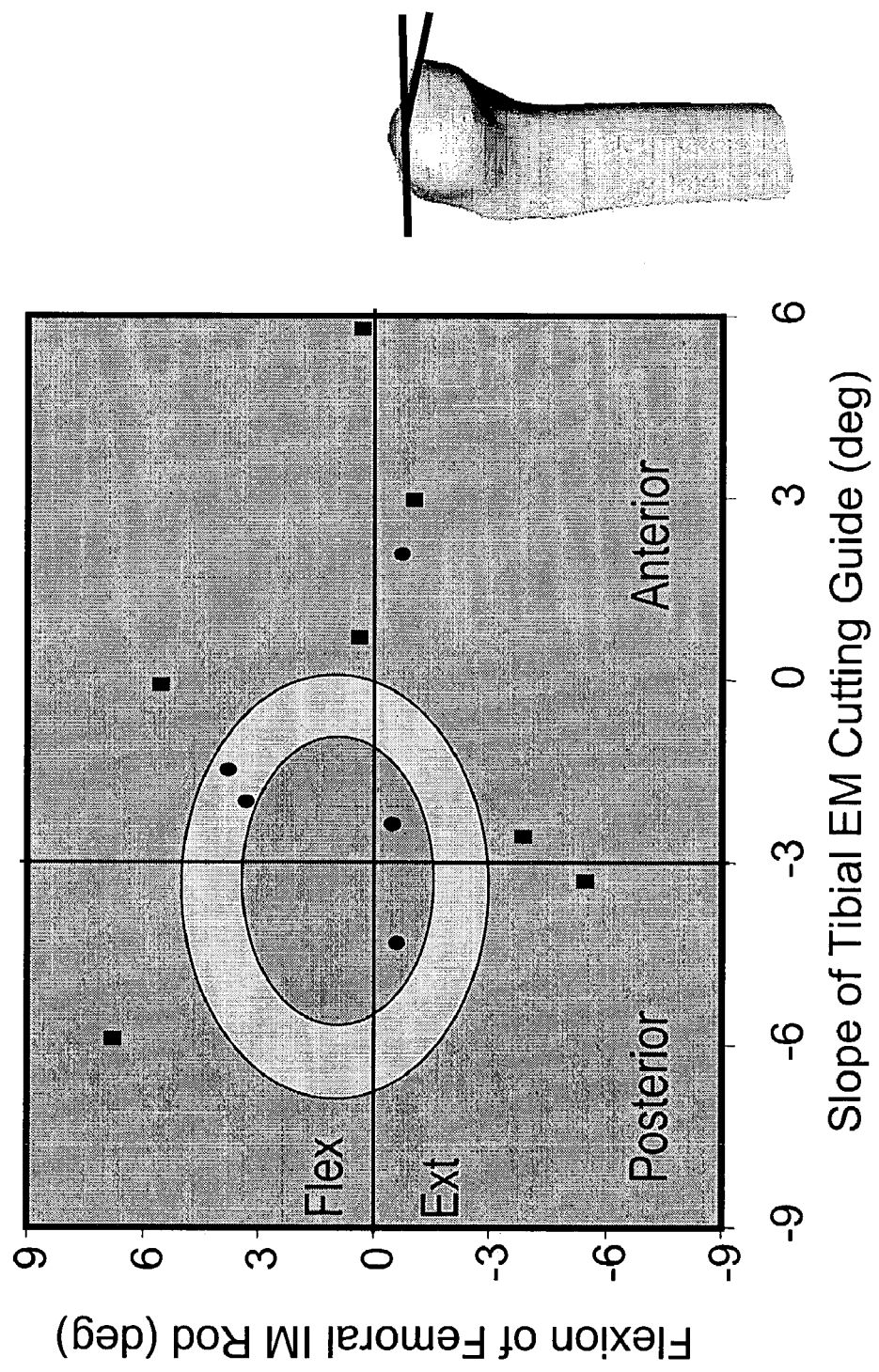

It is also possible to depict the performance of one individual surgeons in comparison with a group of surgeons who have performed the same procedure (see FIGS. 5-6, for example). Alternatively, parameters or information summarizing the distribution of those values on the graph may be displayed. The figures shown herein illustrate various ways to represent the actual data versus target data values described herein.

G. Diagnostic Routines:

The results of the procedure may be displayed on a computer monitor using visualization routines that allow the surgeon to view the following:

a. each step of the surgical procedure, b. the placement of each instrument with respect to each bone and/or soft tissue structures, and c. the consequences of each surgical decision in terms of the final placement of the orthopedic implants.

When differences between the intended (i.e. target) and achieved (i.e. actual) results are detected, the inventive method displays the cause of the deviation in terms of each surgical step and variations in the placement and/or alignment of the relevant instruments. The inventive system allows the surgeon to determine the specific errors in surgical technique that have led to the observed deviation of outcome from the original pre-operative goal. For example, following a total knee replacement procedure, the system may reveal that the knee has inadequate range of motion in flexion and that this is associated with an osteotomy of the proximal surface of the tibia that has too little posterior slope. The diagnostic routines might then show the surgeon that this error was due to malalignment of the tibial cutting guide in the sagittal plane, and that correct placement required that the distal foot of the guide be elevated by an additional 10 mm above the anterior surface of the tibia.

H. Prognostic Routines:

The inventive method also enables the surgeon to predict the functional result achieved by the original plan and the actual placement of the components at surgery. Computer routines "exercise" models of the prosthetic components, simulating motion and laxity, as viewed on the computer monitor. These routines allow the surgeon to decide whether a hip replacement will allow adequate range of motion in performing prescribed procedures, or whether a knee replacement can be performed without soft-tissue releases to achieve acceptable gap kinematics.

The inventive method has numerous applications, as summarized below and described in the examples to follow, these applications including, but not being limited to, the following:

1. To demonstrate the outcome of the surgical procedure in terms of the position or alignment of any instrument or implant.

2. To determine the optimal position or orientation of a surgical instrument with respect to the musculo-skeletal system.

3. Through use of the ability of the system to predict the functional performance of an implant, it is possible to assess the performance or function of new designs of implants, or compare the relative performance or function of alternate designs of devices.
4. To assess the performance or function of any surgical instrument or to compare the relative performance or function of alternate instruments.
5. To demonstrate the difference between the alignment or position of each instrument and/or implant with respect to the bones and/or soft-tissues and a target alignment or position defined by:
   a. fixed anatomic landmarks, and/or
   b. derived mechanical and/or anatomic axes, and/or
   c. positions and/or orientations nominated by the surgeon, and/or
   d. positions and/or orientations pre-determined by consensus or convention.
6. To demonstrate the outcome of the surgical procedure in terms of the predicted response of the bones, joints and soft-tissues to loading, including, but not limited to:
   a. the geometry of the space between resected bony surfaces;
   b. overall alignment and position of a bone or extremity;
   c. changes in the length of a bone or extremity;
   d. the magnitude or distribution derived mechanical and/or anatomic axes, and/or
   e. positions and/or orientations nominated by the surgeon; and/or
   f. positions and/or orientations pre-determined by consensus or convention.
7. To demonstrate the position and alignment of the surgeon's hands and/or the surgical instruments during a surgical procedure.
8. To predict or demonstrate the magnitude, direction or distribution of forces imposed on body tissues, surgical instruments or implanted devices during a surgical procedure.

As described above, the present invention is an application of surgical navigation technologies that allows the quantitative assessment of surgical procedures with reference to a preoperative plan. This preoperative plan defines the target positions and orientations of the instruments and the components relative to the bones. During the operative procedure, the three-dimensional motions of the bones, the instruments, and the final implant components are tracked as the surgeon performs, without providing any feedback or guidance to the surgeon during the procedure. The entire procedure is then reconstructed in virtual space to compare the actual outcome with the ideal outcome. Moreover, by knowing the orientation of each and every surgical instrument, the causes of malalignment of prosthetic components or soft tissue imbalance can be diagnosed in terms of the errors in the orientations of specific instruments. In other words, the exact step at which errors are introduced into the procedure can be determined, and how they propagate and manifest themselves in the final alignment and soft tissue balance can be tracked.

The following examples illustrate specific applications of the inventive method described herein. The examples are not intended to limit the scope of the invention, but are intended to illustrate the various aspects of the invention.

EXAMPLE 1

The following experiment was conducted to assess a number of surgeons with varying skill levels, performing the same procedure with the same instrumentation. Here, fifteen lower extremities were harvested from cadaveric donors (ten males, five females; average age: 76 years). Anteroposterior and lateral radiographs were prepared of each specimen to exclude cases with evidence of previous trauma, or significant skeletal pathology. Scans were obtained of each specimen using a helical scanner (GE Medical Systems) and contiguous slices of 2.5 mm through the shafts of the tibia and femur with slices at a thickness of 1.25 mm through the joint. Three-dimensional computer models (solid models) of the tibia and femur, with a dimensional accuracy of approximately 0.2 mm, were prepared by reconstruction of the data derived from the CT slices. This procedure was performed using commercially available computer programs (MATERIALIZE, vended in Belgium).

Using CAD software routines (Unigraphics Inc, Cypress, Calif.), axis systems were developed to define the location and orientation of the tibia and femur from the three-dimensional solid models. As shown in FIG. 2, for the femur 20, the true flexion/extension axis was found by fitting spheres 13 to the posterior condylar surfaces of the intact femur. The line of best fit through the centroids of cross-sections from the distal third of the femur defined the longitudinal anatomic axis 11. A line mutually orthogonal to the other two axes defined the anterior-posterior axis. The origin of the femoral coordinate system was the point on the longitudinal axis closest to the flexion/extension axis. The mechanical axis of the femur was defined as the axis lying in the plane of the femoral anatomic axis and perpendicular to the flexion/extension axis. As shown in FIG. 3, the line of best fit through the centroids of cross-sections from the proximal third of the tibia 21 defined the longitudinal tibial axis 22. For the medial/lateral axis 23 of the tibia, circles were fit to the cortical edges of the medial and lateral sides at slices 2, 4.5, and 7 mm distal to the tibial plateau. The medial/lateral axis was then calculated by averaging the centers of these circles (FIG. 3). A line mutually orthogonal to the other two axes defined the anterior/posterior axis. The origin of the tibial coordinate system was the point on the medial/lateral axis closest to the longitudinal axis. These axes were utilized to develop a pre-operative plan for ideal placement of the knee replacement components and post-operative alignment and balance of the extremity.

Following radiographic evaluation, the fifteen cadaveric knees were prepared for implantation of a PCL-sacrificing posterior stabilized total knee replacement using one standard set of instruments (Insall-Burstein II, Zimmer). The first step of the procedure involved resection of the proximal tibia using a cutting guide mounted on an extramedullary alignment jig. An intramedullary alignment rod was then inserted through a drilled hole within the intercondylar notch of the distal femur. The anterior cutting guide was indexed off of the anterior femoral cortex, guiding the resection of a preliminary anterior cut to avoid notching of the femur. The distal femoral cutting guide was mounted on the cut anterior femur and determined the distal femoral resection. The femur was sized and the posterior condylar and final anterior cuts were made. The flexion and extension gaps were checked to determine the need to recut the distal femur. The appropriate femoral notch/chamfer guide was then pinned to the cut distal femur and controlled the chamfer cuts and removal of the intercondylar notch. The rotational position of the tibia was determined by pinning the tibial stem template on the cut tibial surface. The tibial stem punch was then pounded into the cancellous bone, creating the cavity for the stem of the tibial tray. Fifteen individuals performed the tibial and femoral cuts on the cadaveric knees: 6 faculty members, 1 total joint fellow, 6 orthopedic residents, 1 physician's assistant, and 1 research engineer. During implantation, the motion analysis system tracked the three-dimensional motions of the bones, all of the instruments, and the final components.

Some interesting results from this example were related to the ability to equally balance the flexion and extension gaps. A well balanced-knee is often considered a primary objective in total knee replacement as soft tissue releases and/or re-cutting bony surfaces are often performed to achieve equal balancing. In this experiment, gap measurements were taken with a custom spreader applying 10 lbs. of opening force at the midline of the joint while measuring the gap opening and the rectangularity. Typically, the knee joint opened more on the lateral edge of the resected surface compared to the medial edge, this difference in (the medial-lateral (ML) gap opening) averaging 2.9±0.5 mm with the knee extended, and 2.4±0.9 mm with the knee flexed. However, the average distance between the femur and the tibia was significantly larger ($p<0.05$) in flexion (19.3±1.8 mm) than extension (14.2±1.4 mm). FIG. 5 shows the individual surgeon performance results for soft tissue balancing of each procedure. The graph In FIG. 5 shows general consensus target zones where the centermost zone 30 is the true goal, the next concentric zone 31 is acceptable but suspect laxity, and the outermost zone 32 represents gap imbalances greater than 6 mm. Analyzing surgical technique in this manner exemplified the effect of experience as 67% of the faculty surgeons were within the pre-operative target zone. As shown in FIG. 5, for example, errors and variability generally increased with decreased training.

Similarly, the accuracy of individual instrument alignment was quantified in this experiment. On average, errors in the insertion point of the intramedullary rod caused it to be positioned 1.6±3.2 mm lateral and 1.9±4.0 mm posterior to the projection of the actual intramedullary axis on the distal femur, as shown in FIG. 6. In alignment, the intramedullary rod was angled 0.3±4.0° anterior (flexion) and 1.0±2.2° medial (varus) to the anatomic axis. FIG. 6 also shows the individual surgeon performance plot for the identification of the correct insertion point for the femoral intramedullary guide. This particular metric depends solely on the judgment of the surgeon, and does not rely on instrumentation, which may explain the significant variability, particularly in the anterior/posterior direction across all skill levels.

FIG. 7 shows a performance plot of the posterior slope of the extramedullary tibial cutting guide versus the flexion of the intramedullary femoral rod in this experiment. The criteria applied stipulate that the zone of acceptance of the posterior slope is ±2° from the objective of 3° posterior slope be built into the instrumentation. The criterion for femoral flexion of the intramedullary rod was from 1° of extension to 5° of flexion. Forty-two percent of the surgeons met these criteria.

Figure 8:
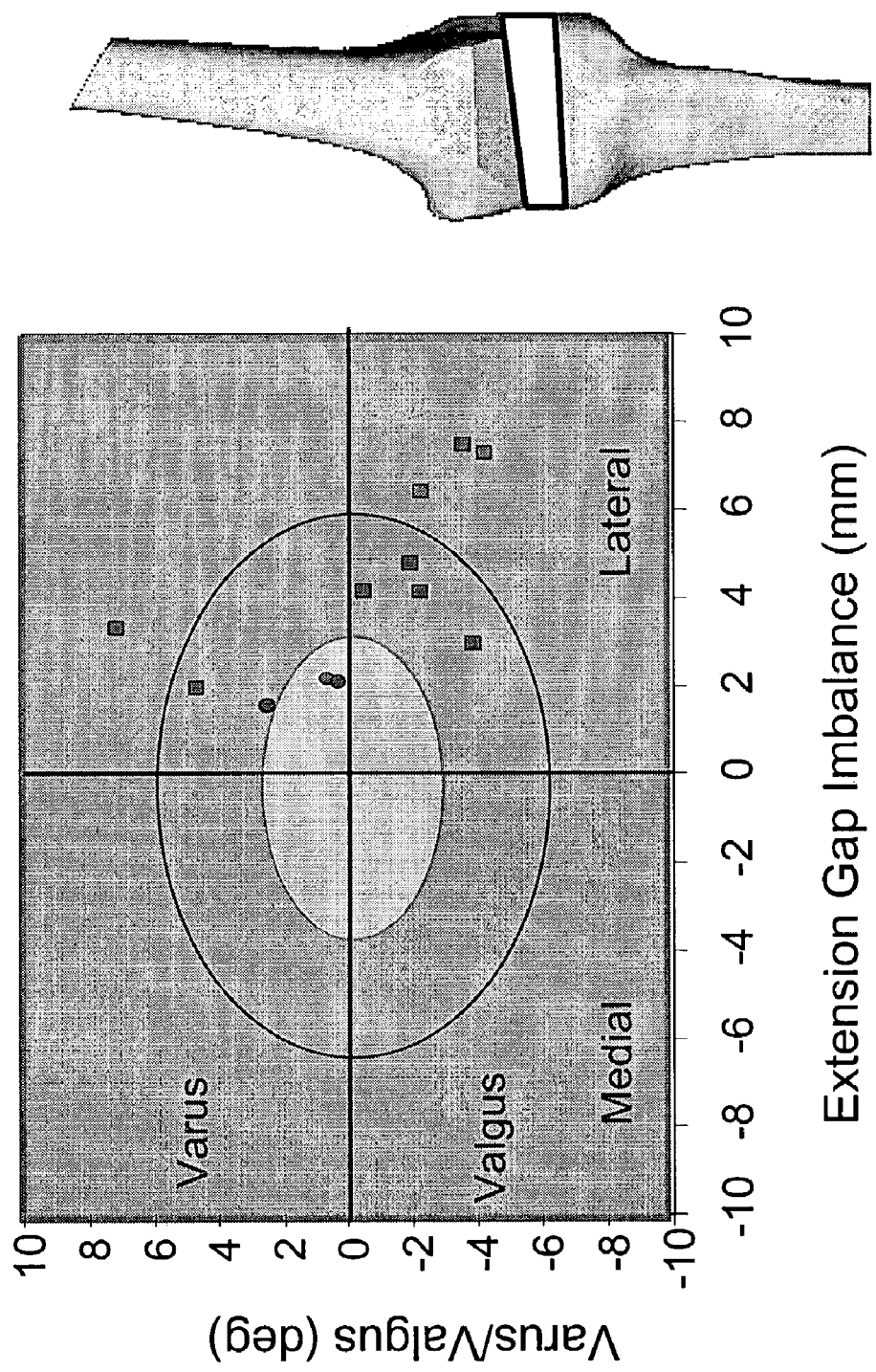

A system that quantitatively assesses all alignment aspects of TKA allows objective performance evaluations of the most critical aspects of the procedure, as shown in this experiment. For example, FIG. 8 shows a performance plot for two variables critical to successful total knee replacement. Because healthy knees were used for this study, a desired alignment outcome was the restoration of the pre-operative varus/valgus alignment. The post-operative change was plotted versus the amount of imbalance in the extension gap. Quantitative criteria can then be applied to assess performance. For example, one standard might be that the varus/valgus angle should not be more than 3 degrees in either direction from normal healthy alignment, and that the difference in the medial and lateral measurement of the extension gap should not be more than 3 millimeters. Only 25% of the surgeries surgeries met these criteria in this experiment.

Figure 9:
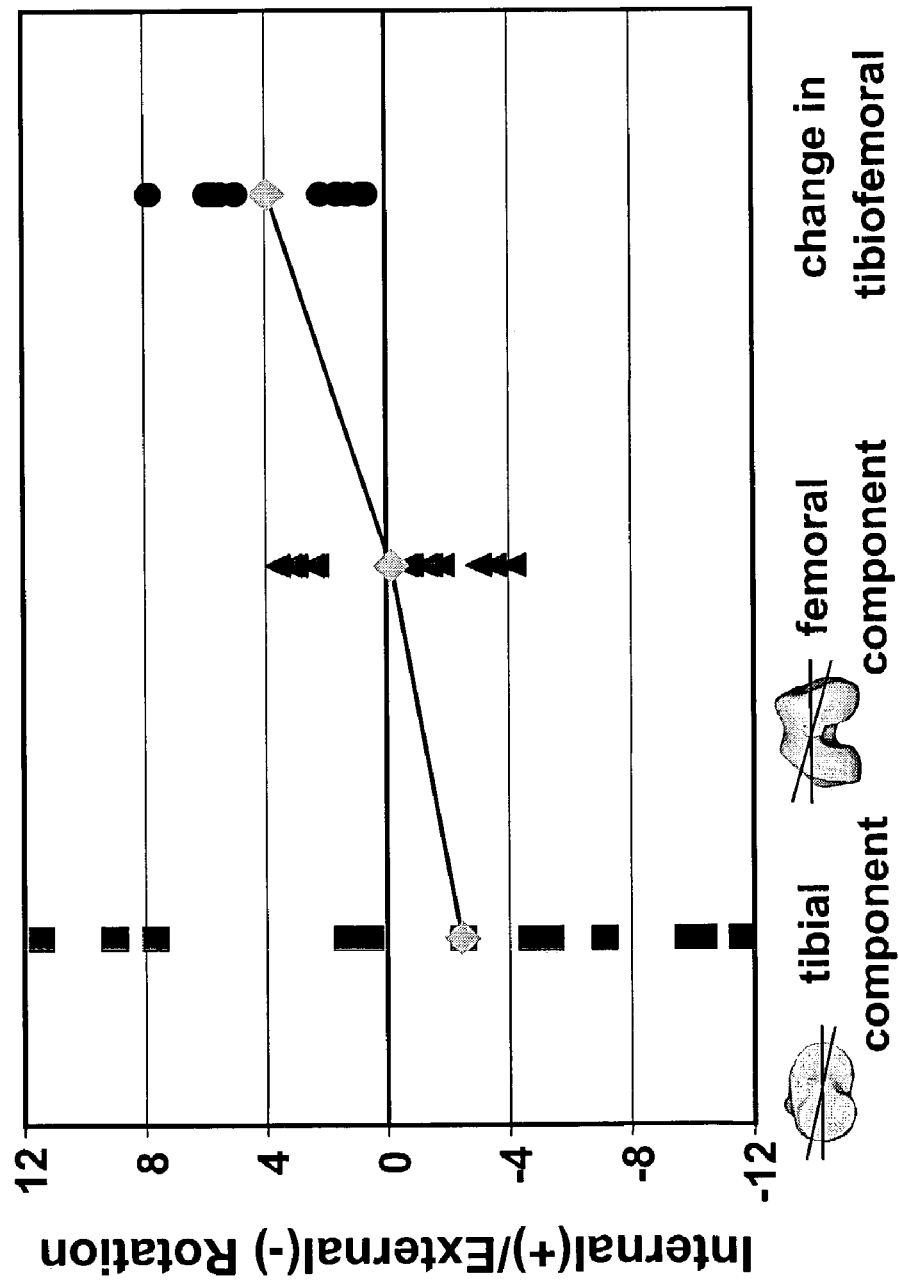

The present method also quantifies the propagation of variability throughout the surgical procedure, as demonstrated in this experiment. The variability in the axial alignment of the components is dominated by the rotational variability of the tibial tray, which in this instrument set is aligned with the tibial tubercle, explaining its average external rotation (FIG. 9). The graph in FIG. 9 also shows how, on average, external rotation of the tibial articular surface coupled with neutral rotation of the femoral component causes a net internal rotation of the limb when reduced in extension.

EXAMPLE 2

Figure 10:
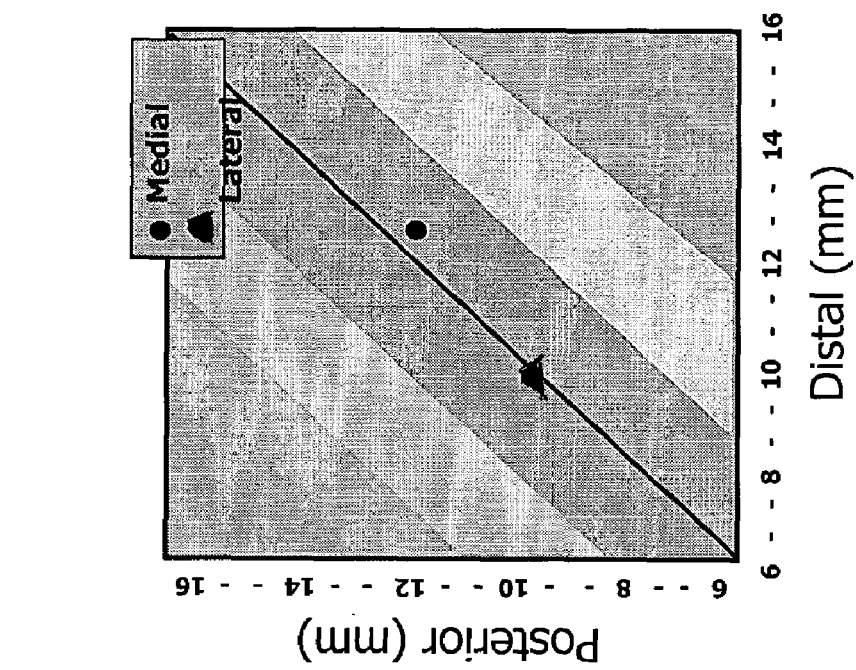
FIGS. 10-17 are various graphs and drawings used to illustrate the use of the inventive method in a second knee arthroscopy experiment described in Example 2.
Figure 10:
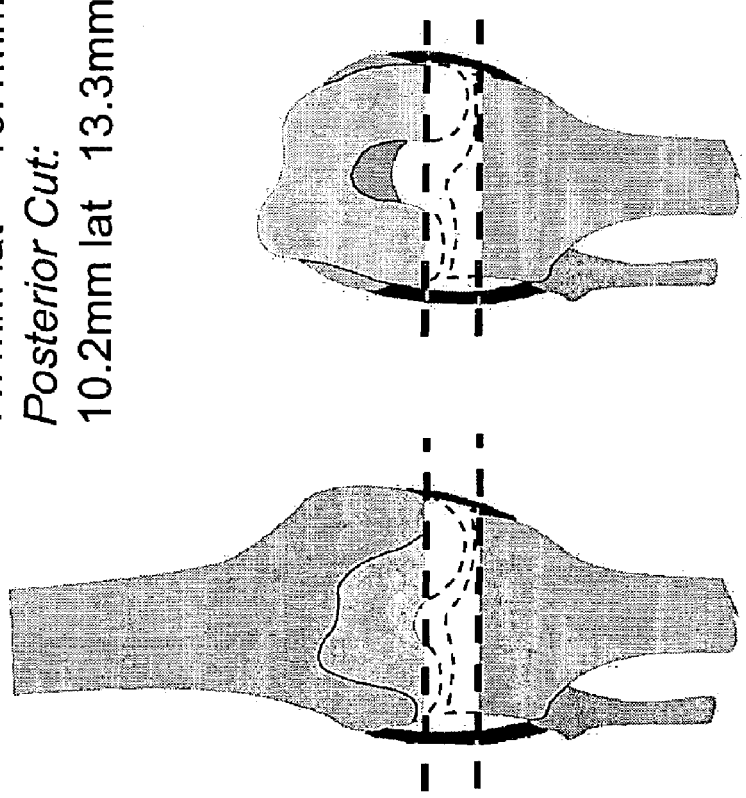
Figure 11:
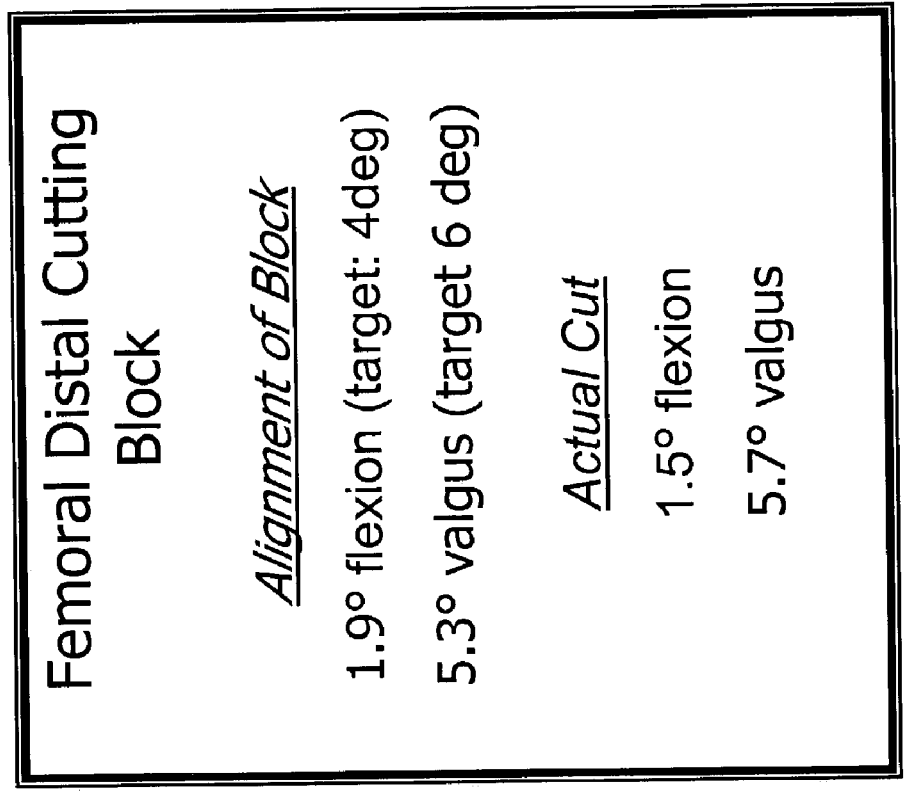
Figure 11:
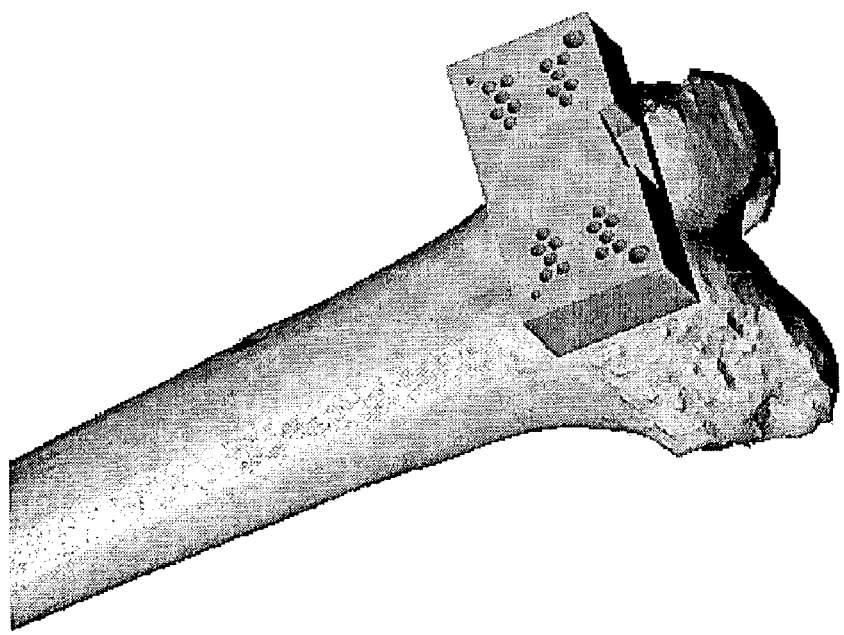
Figure 12:
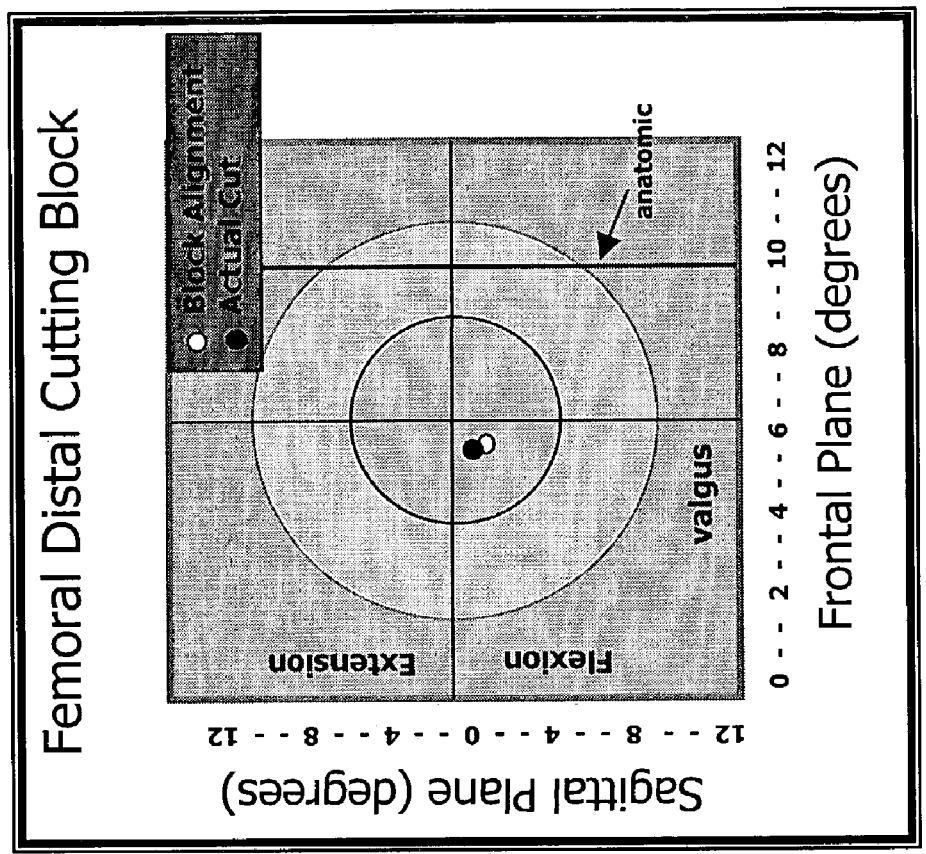
Figure 12:
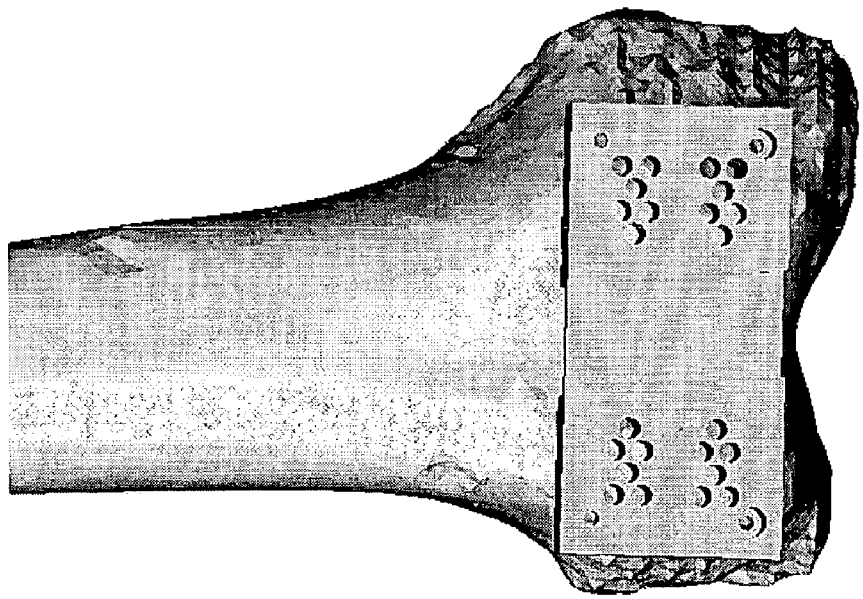

On a case by case basis, measuring the alignment of many of the instruments during the surgical procedure allows the identification and tracking of errors throughout the surgery. The following describes the results of one particular surgery using PCL retaining components and instrumentation. The philosophy of this surgical procedure was a "balanced resection" technique (FIG. 10). Unlike other techniques, balanced resection requires equality in the distal and posterior cuts independently on the lateral and medial side. The difference in resection medial to lateral was insignificant. The amount of resection medially and laterally was determined by a fixed valgus cut of the femur distally (dependent on the design of the femoral cutting guide and femoral component). Once this level was determined in full extension, the amount of resection of the posterior condyles in flexion is matched. FIGS. 11-12 quantitatively show the implementation of this plan, while FIG. 10 shows the how accurate this technique was followed with the 45 degree line indicating perfect balanced resection.

Figure 13:
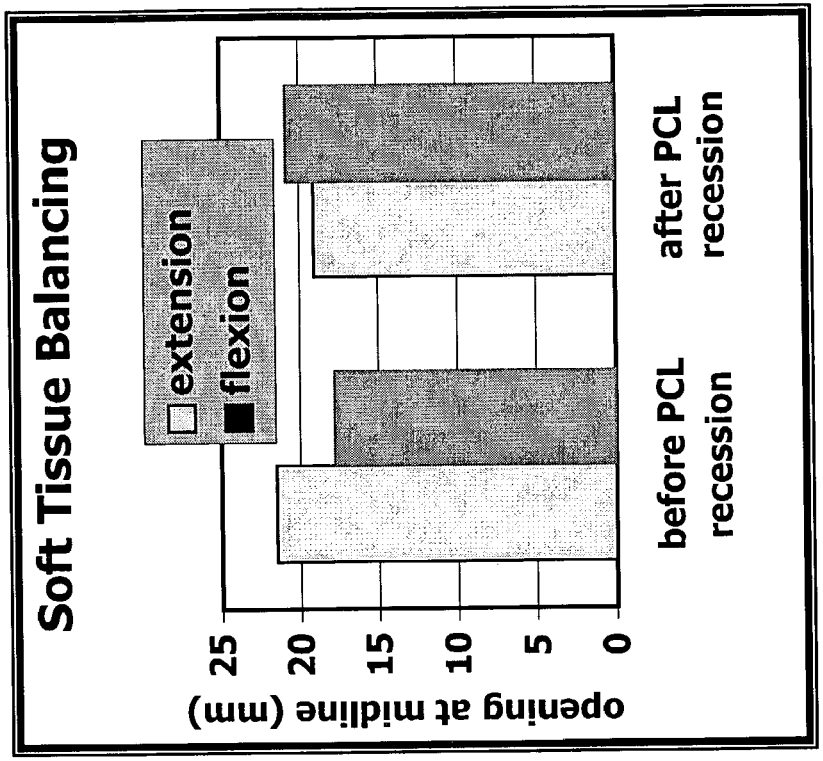
Figure 14:
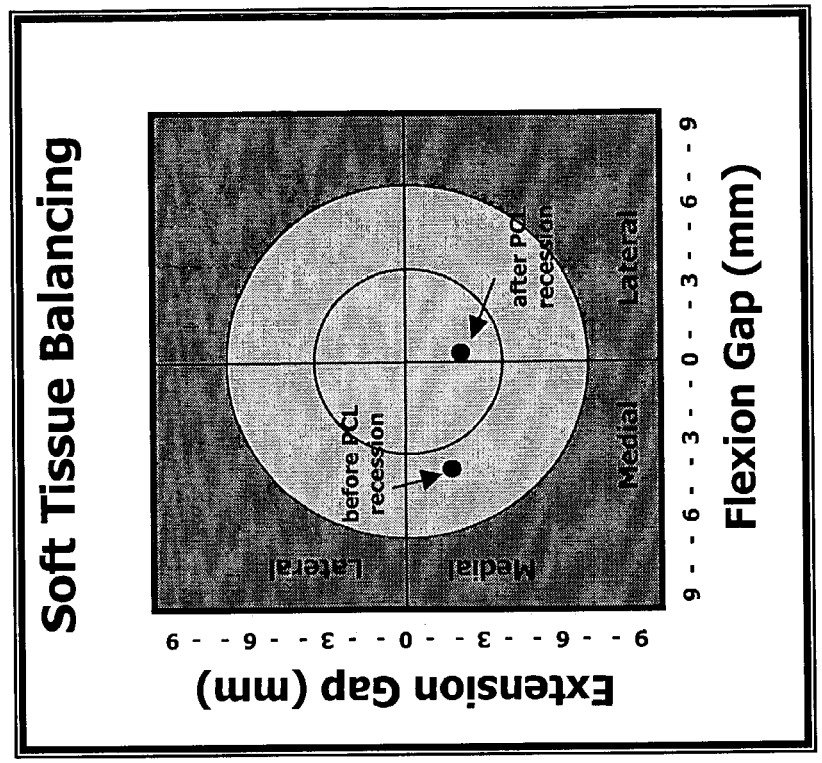
Figure 14:
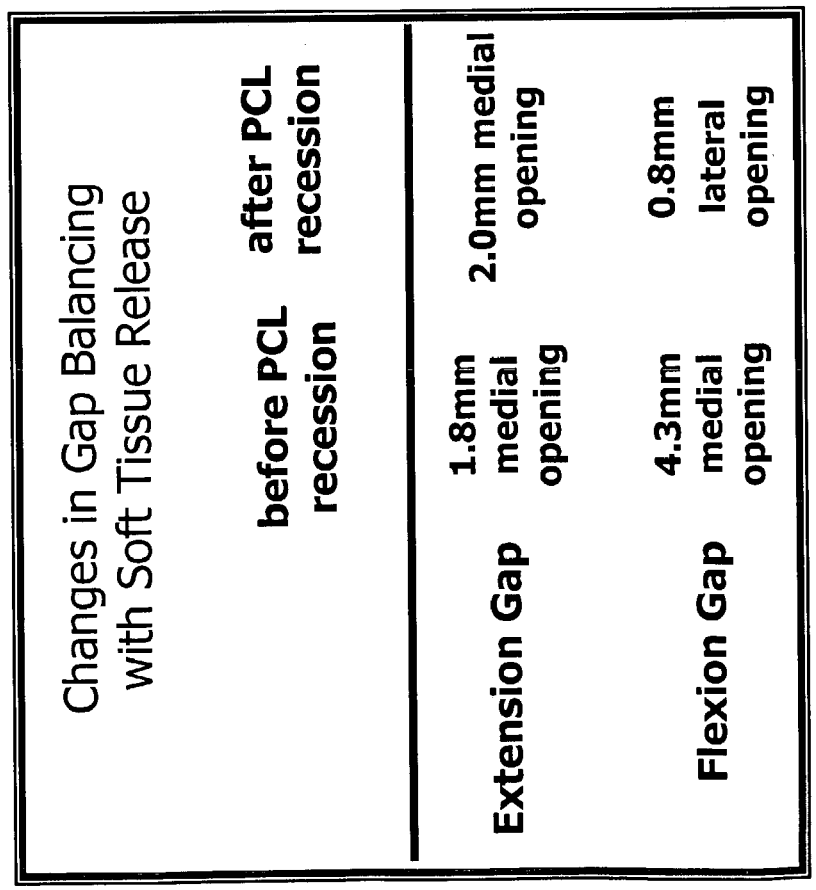
Figure 15:
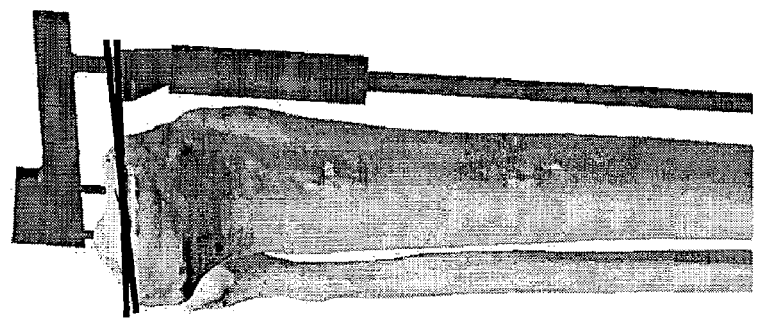
Figure 15:
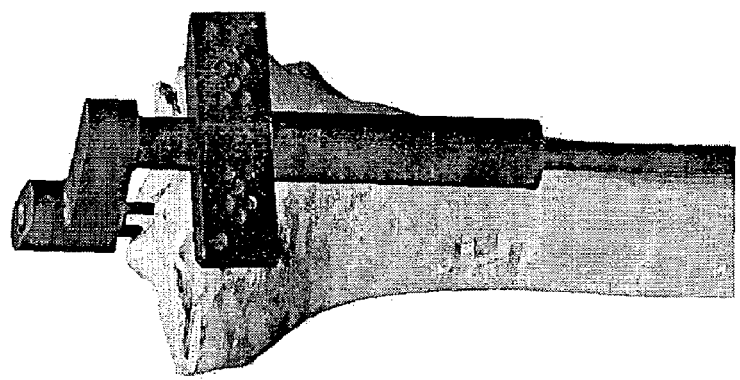
Figure 16:
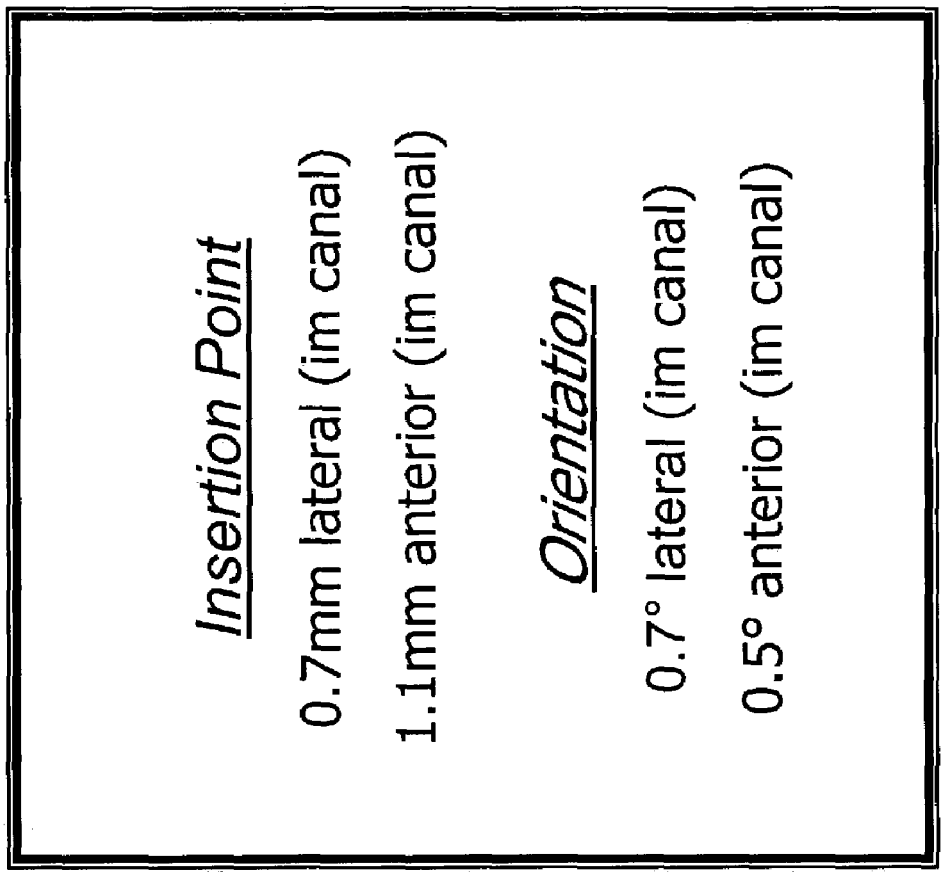
Figure 16:
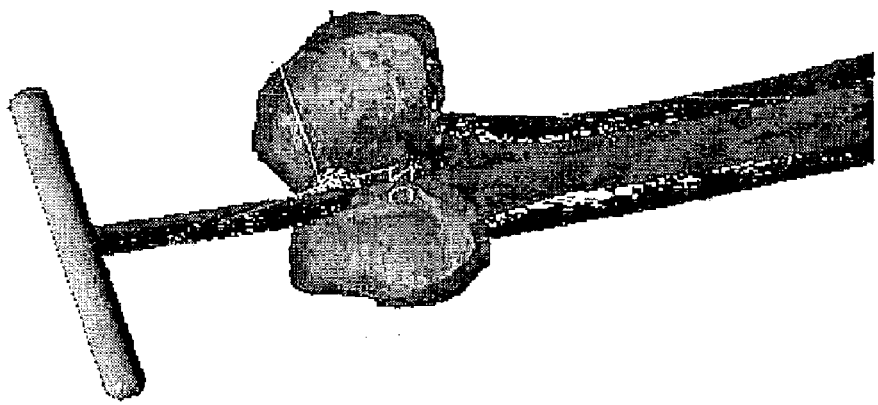
Figure 17:
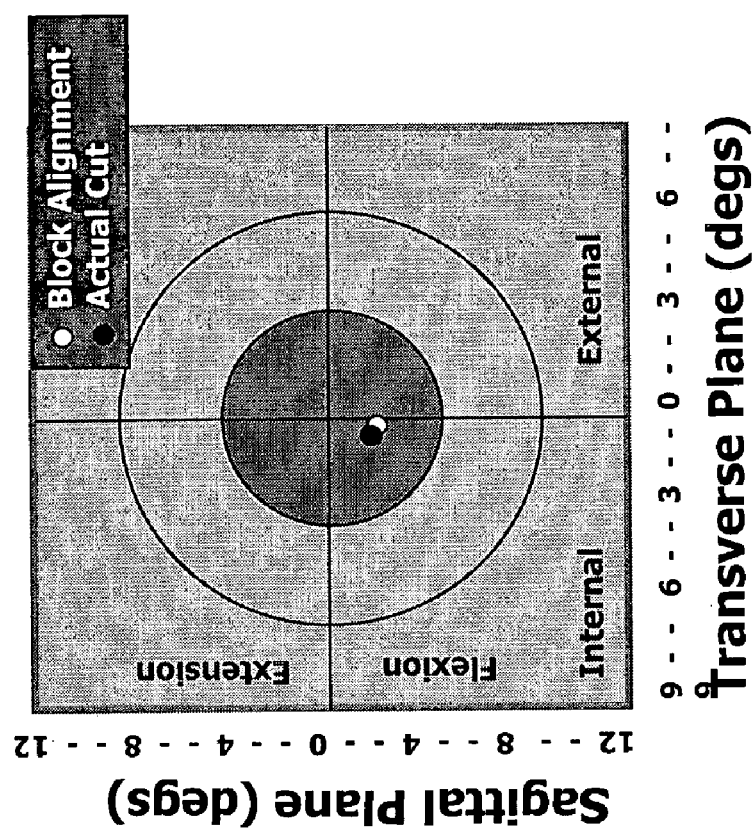
Figure 17:
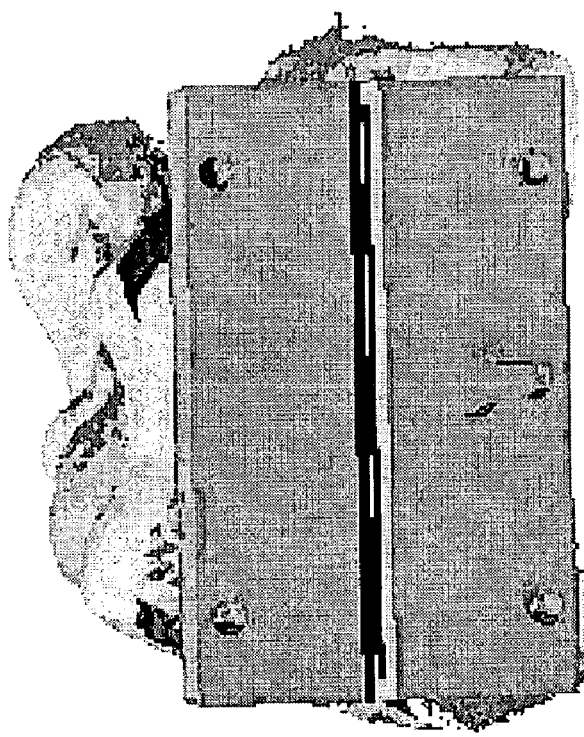

After the cuts were made intraoperatively and the trial components were positioned, it was found that this particular knee was extremely tight in extension and gapping open excessively medially in flexion. While the actual cause could not be determined by the surgeon intraoperatively, the course of action was a partial PCL release. FIGS. 13-14 show that this corrective technique shifted the gap imbalance to acceptable if not ideal levels. The present method was able to quantitatively diagnosis the error that caused this instability. It was determined that this particular specimen had an excessive natural posterior tibial slope of 11 degrees. The preoperative plan was to slightly undercut the natural slope resulting in 9 degrees of posterior slope in the tibial insert. However, due to the cumbersome technique of adjusting the ankle clamp of extramedullary tibial guides, the actual cut was 6 degrees (FIG. 15). This error was the cause of the inability to fully extend the knee with the trial inserts. While the partial PCL release was successful, a second option was to recut the tibia as diagnosed by the quantitative bioskills system. FIGS. 16 and 17 display the accuracy of location and orientation of the femoral intramedullary rod and the femoral anteroposterior cutting block, respectively.

EXAMPLE 3

Figure 18:
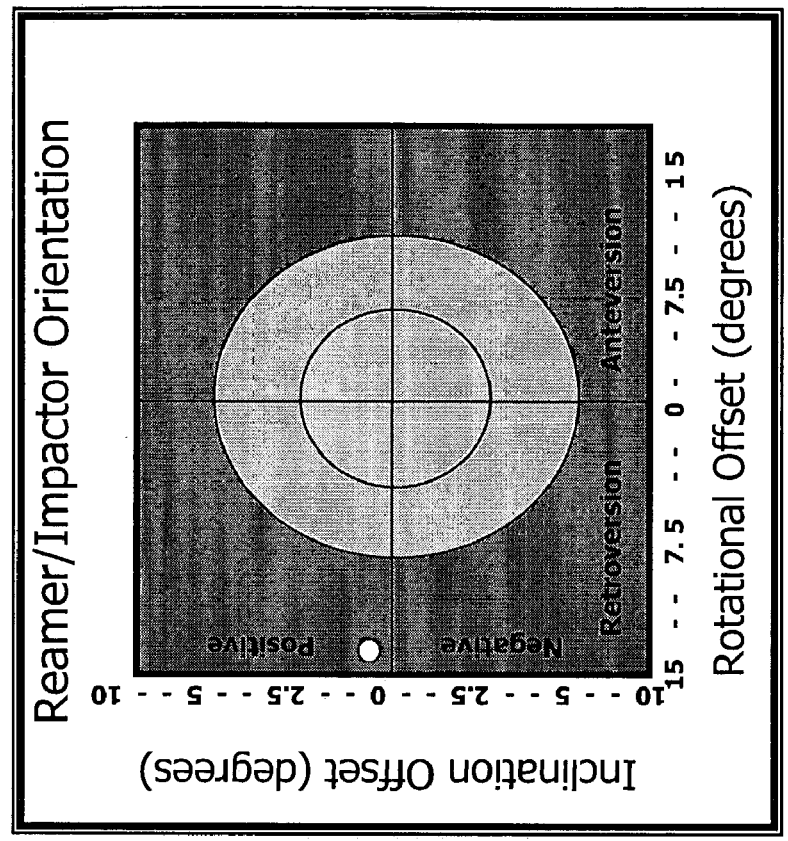
FIGS. 18-21 are various graphs and drawings used to illustrate the use of the inventive method in a hip replacement, as described in Example 3.
Figure 18:
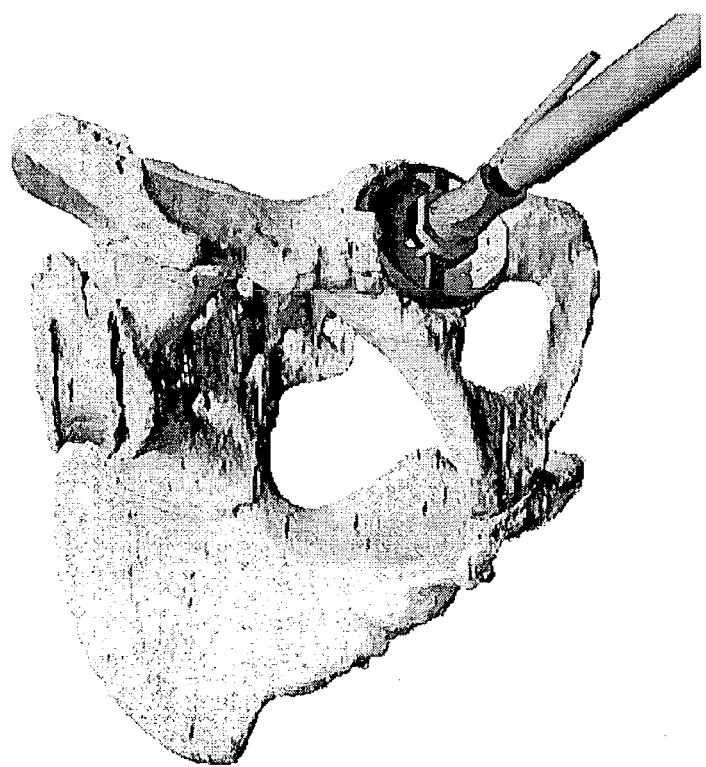
Figure 19:
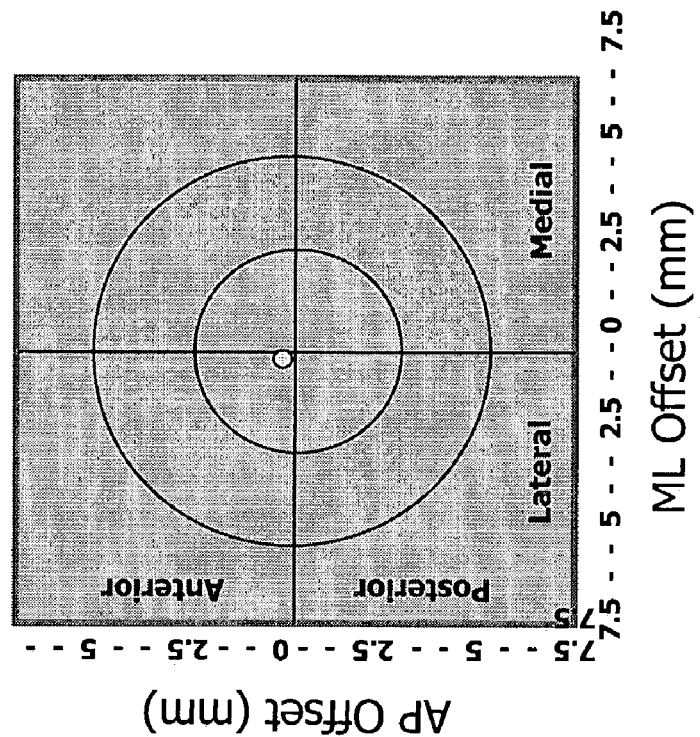
Figure 19:
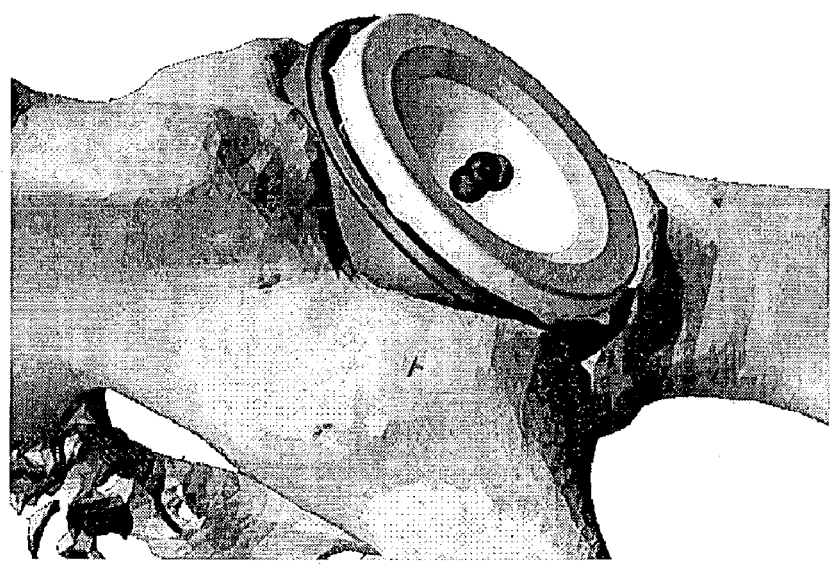
Figure 20:
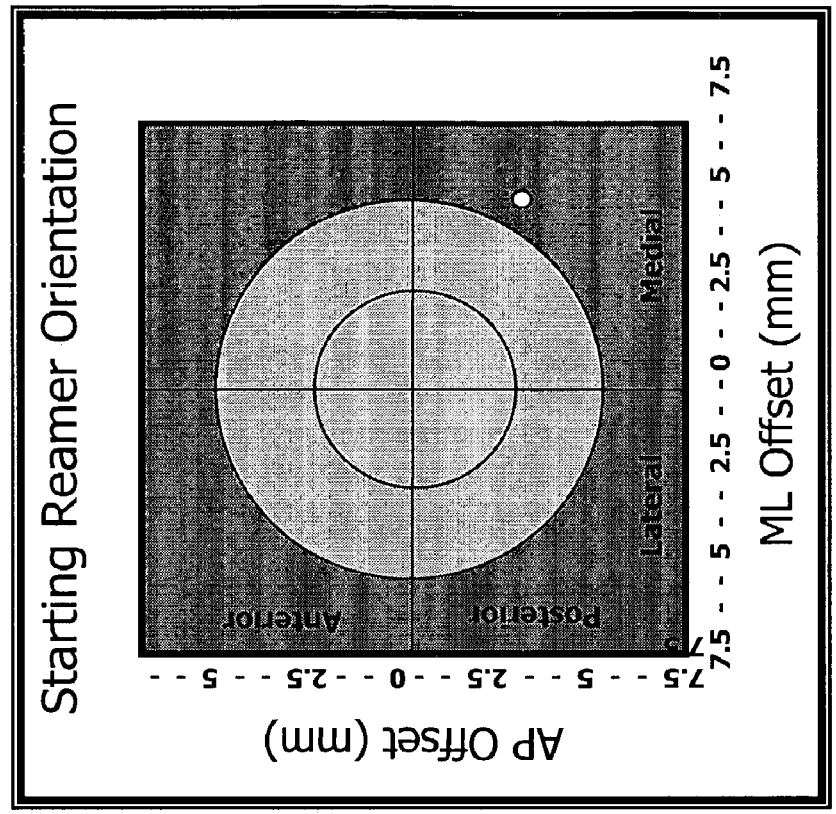
Figure 20:
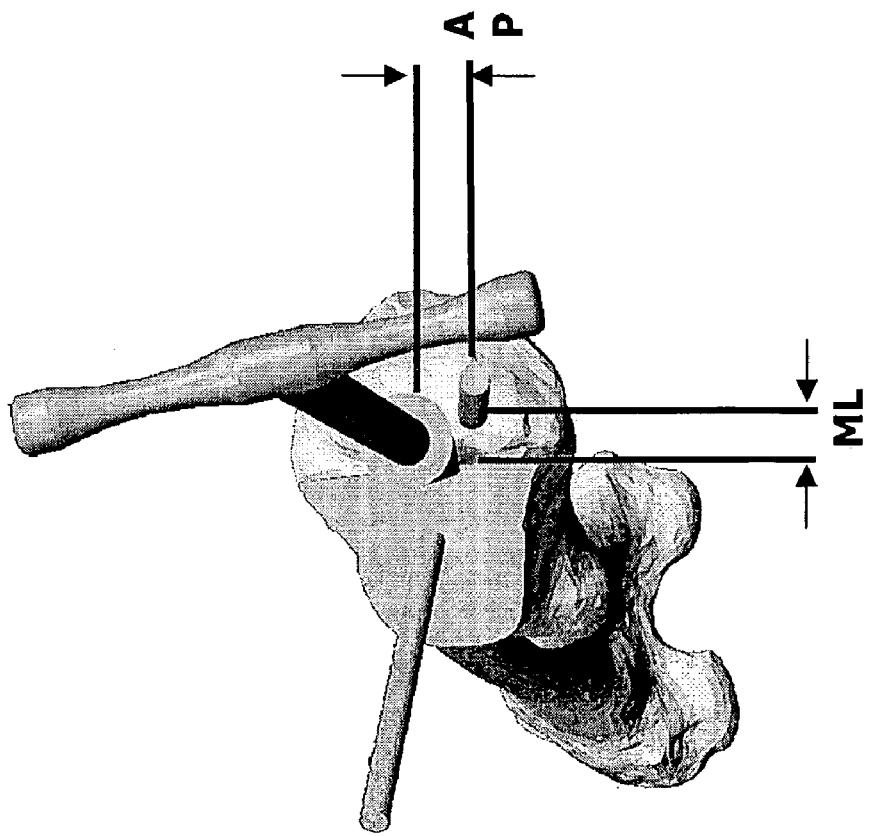
Figure 21:
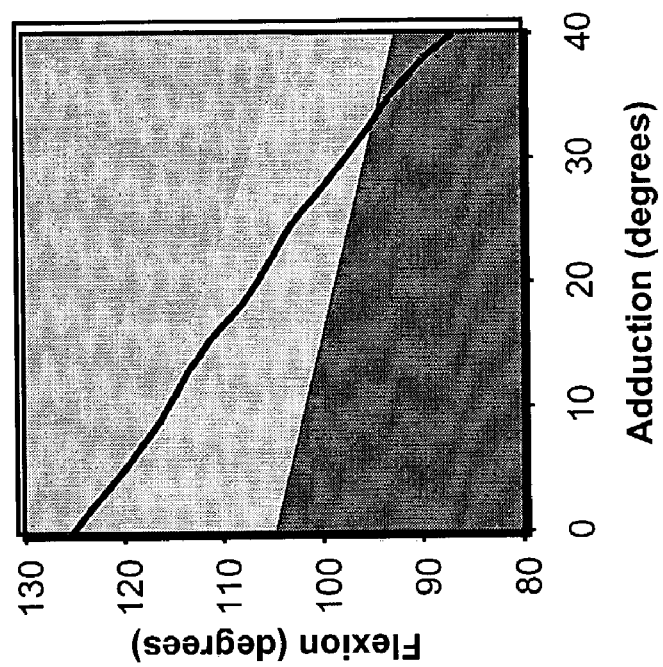
Figure 21:
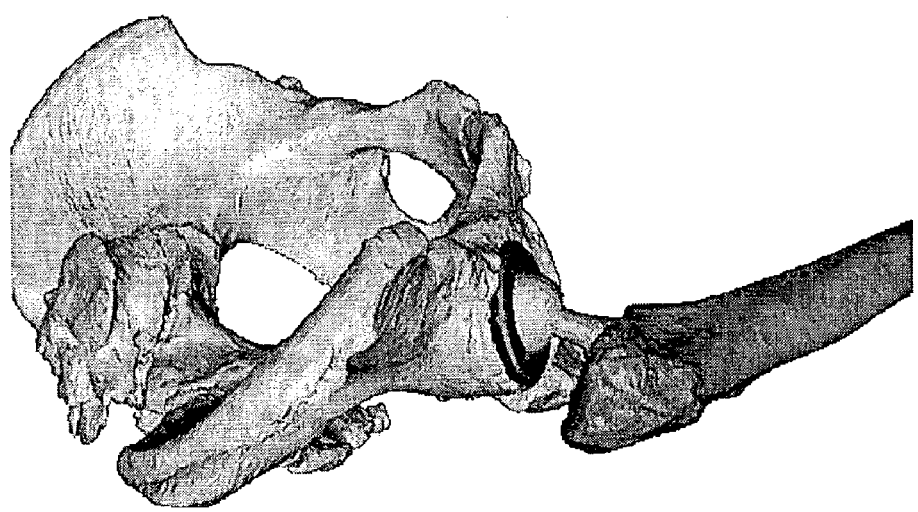

The present method was also applied to total hip replacement. FIG. 18 shows the rotational orientation of the acetabular reamer. This particular surgery fell outside acceptable range in terms of rotational offset resulting in significant retroversion of the prepared acetabular surface. FIG. 19 shows that when seated, the cup did reach the intended position. On the femoral side, FIG. 21 shows the positional malalignment of the entry point for the start awl. Finally, FIG. 20 shows the combined effect of the positional and rotational placement of the implanted components in terms of the predicted range of motion of the reconstructed joint. The graph in FIG. 21 shows the combinations of hip flexion and hip adduction that may have a higher propensity for impingement.

We claim:

1. A method suitable for analyzing surgical techniques, said method comprising:
   a. generating three-dimensional computer models of orthopedic devices, said devices selected from the group of orthopedic instruments and implants, wherein data corresponding to said models is stored in a memory system of a computer;
   b. generating three-dimensional models of a targeted surgical site on a body portion based upon tomographic data stored in the memory system for the surgical site;
   c. inputting into said memory select target values corresponding to one or more measurable technical parameters associated with said surgical procedure, said parameters selected from the group consisting of three-dimensional positioning and dimensions of bones, three-dimensional positioning and dimensions of soft tissue structures, three-dimensional positioning and dimensions of said orthopedic devices for surgery, and predicted values corresponding to range and forces associated with physiologic joint motion and joint laxity;
   d. attaching one or more tracking devices to said body near said target surgical site, said tracking devices operatively in communication with said computer system;
   e. performing a surgical procedure on said target surgical site;
   f. communicating tracking data generated during said surgical procedure to said computer system;
   g. calculating actual values based upon said tracking data, said actual values corresponding to said technical parameters set for the surgical procedure; and
   h. comparing said target values and said actual values of said technical parameters after performing said surgical procedure.

2. The method of claim 1 further comprising recording data generated during said surgical procedure via said tracking devices for storage of said data onto said computer memory system, said data selected from the group consisting of positioning of said orthopedic devices, bones, and soft tissue structures.

3. The method of claim 1 further comprising utilizing said comparison of said target values and said actual values as a training tool.

4. The method of claim 3 further comprising generating a final three-dimensional model corresponding to said three-dimensional models of said orthopedic devices and body portion post-surgery, said final model showing actual responses of anatomical features to loading forces based upon said actual values calculated as compared to predicted responses of said anatomical features to loading forces based upon said target values inputted, said anatomical features selected from the group consisting of bones and soft tissue structures.

5. The method of claim 4, wherein said actual and predicted responses to said loading forces displayed on said final three-dimensional model are selected from the group consisting of a) geometry of space between resected bony surfaces, b) overall position of a bone or extremity, c) changes in length of a bone or extremity, d) magnitude or distribution of mechanical axes, e) magnitude or distribution of anatomic axes, f) positions selected by a surgeon, and e) positions pre-determined by consensus or convention within a surgical community.

6. The method of claim 5, wherein said final three-dimensional model is used to evaluate performance characteristics of one or more of said orthopedic devices during said surgical procedure.

7. The method of claim 5, where said final three-dimensional model is used as a surgical training tool for understanding errors and reasons for said errors that occurred during said surgical procedure.

8. The method of claim 5, wherein said final three-dimensional model is used to evaluate performance characteristics of one or more of surgical techniques used during said surgical procedure.

9. A method suitable for analyzing surgical techniques, said method comprising:
   a. generating three-dimensional computer models of orthopedic devices, said devices selected from the group of orthopedic instruments and implants, wherein data corresponding to said models is stored in a memory system of a computer;
   b. generating three-dimensional models of a targeted surgical site on a body portion based upon tomographic data stored in the memory system for the surgical site;
   c. inputting into said memory select target values corresponding to one or more measurable technical parameters associated with said surgical procedure, said parameters selected from the group consisting of three-dimensional positioning and dimensions of bones, three-dimensional positioning and dimensions of soft tissue structures, three-dimensional positioning and dimensions of said orthopedic devices for surgery, and values corresponding to range and loading forces associated with physiologic joint motion and joint laxity;
   d. attaching one or more tracking devices to said body portion, said tracking devices operatively in communication with said computer system;
   e. performing a surgical procedure on said target surgical site;
   f. communicating tracking data generated during said surgical procedure to said computer system;
   g. calculating actual values based upon said tracking data, said actual values corresponding to said technical parameters set for the surgical procedure;
   h. training a surgeon after the surgery by reviewing the calculated actual values and the target values corresponding to said technical parameters.

10. The method of claim 9 wherein training the surgeon further comprises comparing said target values and said actual values of said technical parameters after performing said surgical procedure.

11. The method of claim 9 further comprising recording data generated during said surgical procedure via said tracking devices for storage of said data onto said computer memory system, said data selected from the group consisting of positioning of said orthopedic devices, bones, and soft tissue structures.

12. The method of claim 11 further comprising generating a graph for comparing one or more of said actual values to said target values.

13. The method of claim 12, wherein said graph comprises an X-axis and a Y-axis, each of said axes corresponding to a range of technical parameters, said graph further including one or more visual target zones corresponding to an acceptable range of said target values, and wherein said actual values calculated for said technical parameters labeled on said axes are visually plotted on said graph either within or outside said one or more target zones.

14. The method of claim 13, where said final three-dimensional model is used as a surgical training tool for understanding errors and reasons for said errors that occurred during said surgical procedure.

15. The method of claim 13, wherein said final three-dimensional model is used to evaluate performance characteristics of one or more of said orthopedic devices during said surgical procedure.

16. The method of claim 13, wherein said final three-dimensional model is used to evaluate performance characteristics of one or more of surgical techniques used during said surgical procedure.

17. A method suitable for analyzing surgical techniques, said method comprising:
   a. generating three-dimensional computer models of orthopedic devices, said devices selected from the group of orthopedic instruments and implants, wherein data corresponding to said models is stored in a memory system of a computer;
   b. generating three-dimensional models of a targeted surgical site on a body portion based upon tomographic data stored in the memory system for the surgical site; p1
   c. inputting into said memory select target values corresponding to one or more measurable technical parameters associated with said surgical procedure, said parameters selected from the group consisting of three-dimensional positioning and dimensions of bones, three-dimensional positioning and dimensions of soft tissue structures, three-dimensional positioning and dimensions of said orthopedic devices for surgery, and values corresponding to range and loading forces associated with physiologic joint motion and joint laxity;
   d. attaching one or more tracking devices to said body portion, said tracking devices operatively in communication with said computer system;
   e. performing a surgical procedure on said target surgical site;
   f. recording data during said surgical procedure via said tracking devices for storage of said data onto said computer memory system, said data selected from the group consisting of positioning of said orthopedic devices, bones, and soft tissue structures;
   g. calculating actual values based upon said tracking data, said actual values corresponding to said technical parameters set for the surgical procedure; and
   h. comparing said target values and said actual values of said technical parameters after performing said surgical procedure.

18. The method of claim 17, wherein said body portion is an inanimate anatomical model.

19. The method of claim 17, wherein said body portion is from a cadaver.

20. The method of claim 17, wherein said body portion is a live patient.

21. The method of claim 17 further comprising utilizing said comparison of said target values and said actual values as a training tool.

22. The method of claim 21 further comprising:
   comparing said actual values from two or more surgical procedures to said target values to determine optimal positioning of said surgical instruments with respect to said bones and soft tissue structures of future target surgical sites in order to creating a preoperative surgical plan based upon said determination of optimal positioning.

23. The method of claim 21 further compromising:
   generating a final model corresponding to said models of said surgical devices and body portion post-surgery, said final model showing actual positions compared to targeted positions of said devices with respect to selected anatomical features within said targeted surgical site of said body, wherein said actual positions correspond to said actual values calculated and said targeted positions correspond to said target values inputted.

24. The method of claim 21 further comprising generating a final three-dimensional model corresponding to said three-dimensional models of said orthopedic devices and body portion post-surgery, said final model showing actual positions compared to targeted positions of said orthopedic devices with respect to selected anatomical features within said targeted surgical site of said body portion, said anatomical features selected from the group consisting of bones and soft tissue structures, and wherein said actual positions correspond to said actual values calculated and said targeted positions correspond to said target values inputted.

25. The method of claim 24, wherein said final three-dimensional model shows differences between a) actual positions of said orthopedic devices with respect to said anatomical features and b) target positions of said orthopedic device with respect to said anatomical features, said target positions defined by one or more of the group consisting of i) fixed anatomic landmarks, ii) derived mechanical axes, iii) derived anatomic axes, iv) positions selected by a surgeon, and v) positions pre-determined by consensus or convention within a surgical community.

26. The method of claim 25, where said final three-dimensional model is used as a surgical training tool for understanding errors and reasons for said errors that occurred during said surgical procedure.

27. The method of claim 25, wherein said final three-dimensional model is used to evaluate performance characteristics of one or more of said orthopedic devices during said surgical procedure.

28. The method of claim 25, wherein said final three-dimensional model is used to evaluate performance characteristics of one or more of surgical techniques used during said surgical procedure.

29. The method of claim 21 further comprising:
   comparing said target values and said actual values of said technical parameters for at least one of said procedural steps by generating a final three-dimensional model corresponding to said three-dimensional models of said orthopedic devices and body portion post-surgery, said final model showing actual positions of said orthopedic devices with respect to said body to targeted positions of said devices with respect to said body for at least one of said procedural steps, said actual positions corresponding to said actual values calculated, and said targeted positions corresponding to said target values inputted.

30. The method of claim 29, wherein said final three-dimensional model shows differences between a) actual positions of said orthopedic devices with respect to said anatomical features and b) target positions of said orthopedic device with respect to anatomical features, said target positions defined by one or more of the group consisting of i) fixed anatomic landmarks, ii) derived mechanical axes, iii) derived anatomic axes, iv) positions selected by a surgeon, and v) positions pre-determined by consensus or convention within a surgical community.

31. The method of claim 30, where said final three-dimensional model is used as a surgical training tool for understanding errors and reasons for said errors that occurred during said surgical procedure.

32. The method of claim 30, wherein said final three-dimensional model is used to evaluate performance characteristics of one or more of said orthopedic devices during said surgical procedure.

33. The method of claim 21 further comprising generating one or more graphs for comparing one or more actual values to said target values.

34. The method of claim 33, wherein said graph comprises an X-axis and a Y-axis, each of said axes corresponding to a range of technical parameters, said graph further including one or more visual target zones corresponding to an acceptable range of said target values, and wherein said actual values calculated for said technical parameters labeled on said axes are visually plotted on said graph either within or outside said one or more target zones.

35. The method of claim 34, wherein said each of said two or more surgical procedures are identical, each performed by different individuals, such that upon further analysis of said graph, individual surgical performances of each of said individuals may be compared.

36. The method of claim 33, wherein said each of said two or more surgical procedures are identical, each performed by different individuals, such that upon further analysis of said graph, individual surgical performances of each of said individuals may be compared.

* * * * *